Oct. 16, 1956 L. A. DEVER ET AL 2,766,711
PRESS
Filed Aug. 9, 1950 14 Sheets-Sheet 2
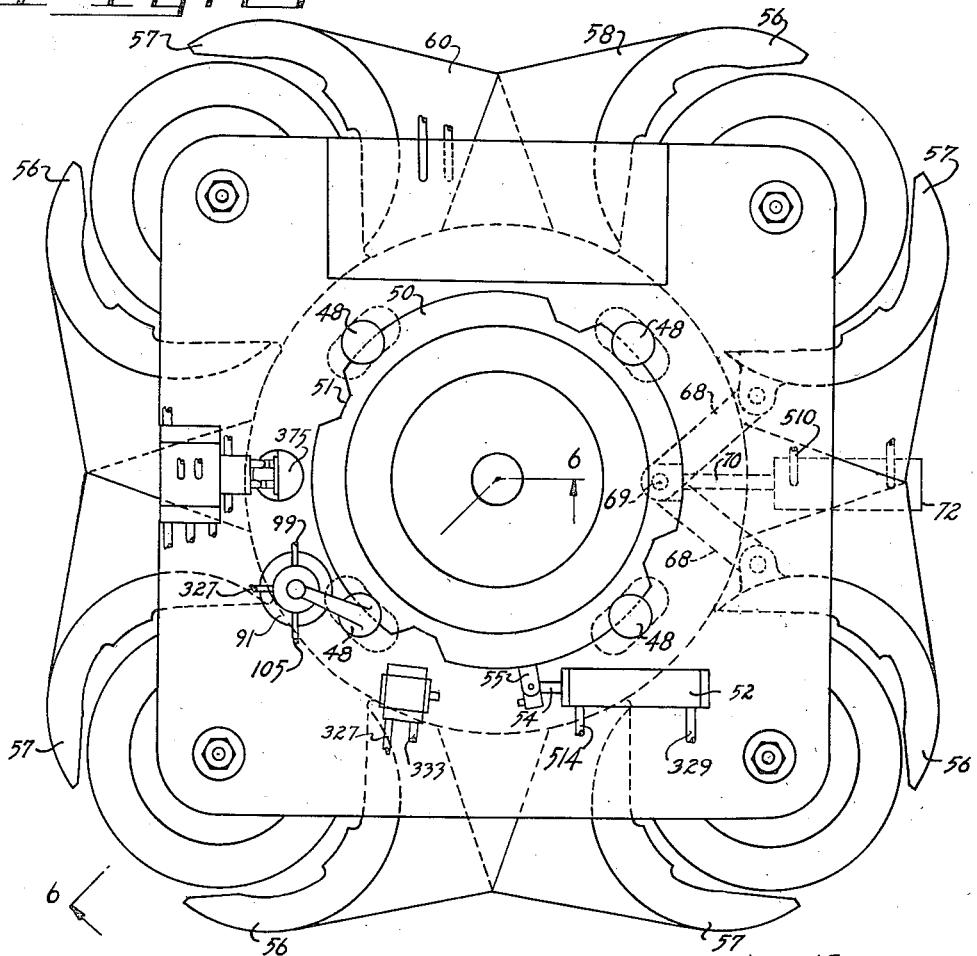
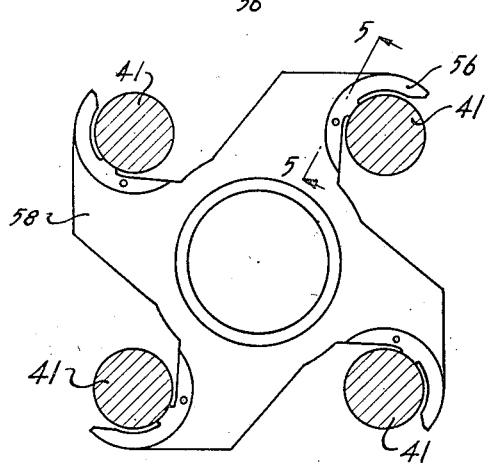
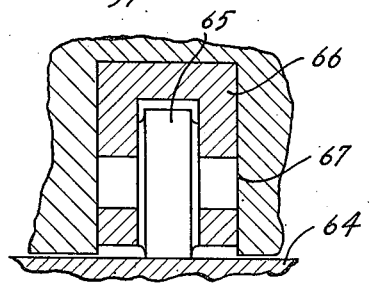
INVENTORS
LEWIS A. DEVER
BY KENNETH P. MARTIN
H. K. Parsons & C. W. Wright
ATTORNEYS Oct. 16, 1956 L. A. DEVER ET AL 2,766,711
PRESS
Filed Aug. 9, 1950 14 Sheets-Sheet 3

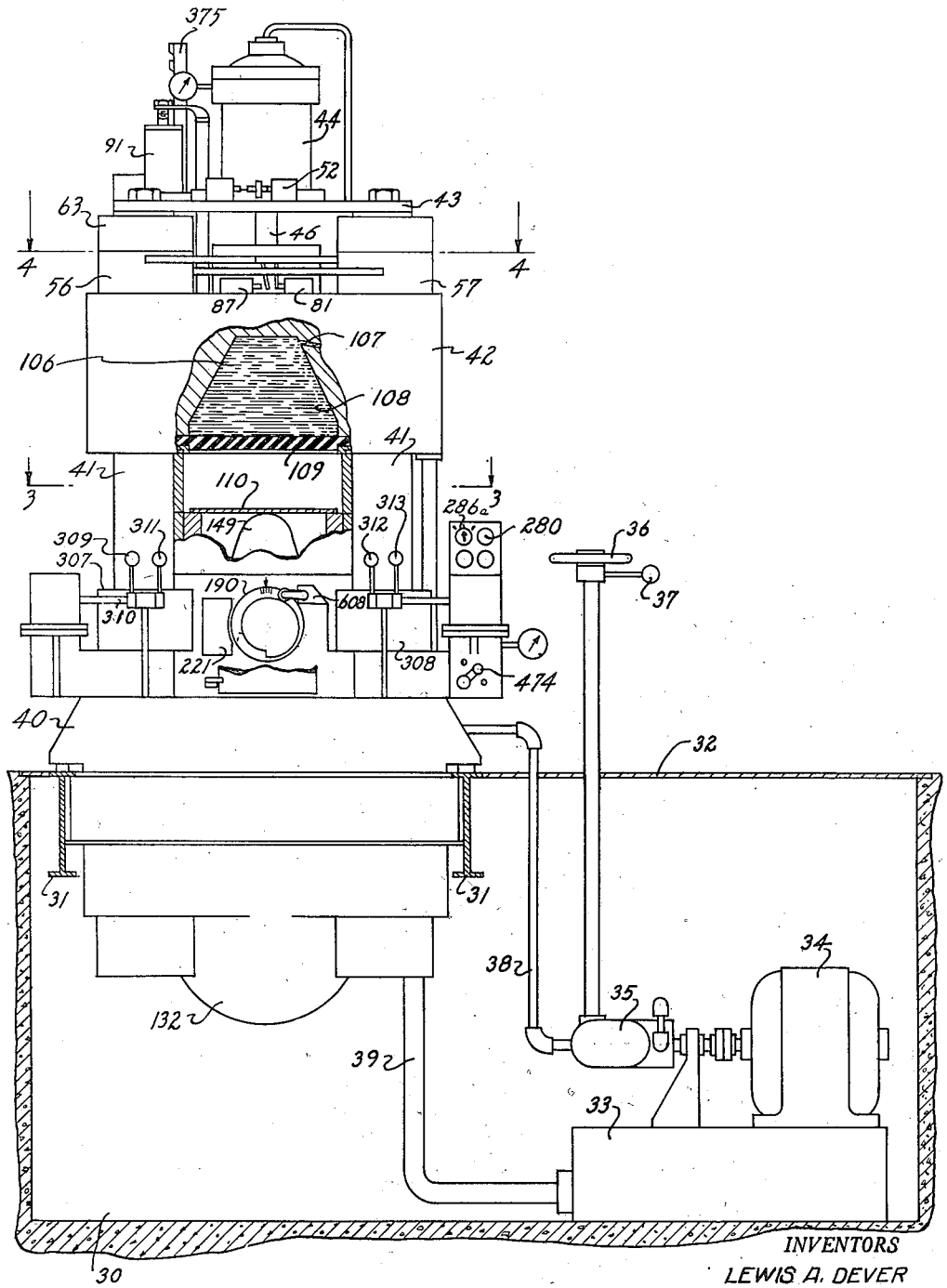

INVENTORS
LEWIS A. DEVER
KENNETH P. MARTIN
BY
H. K. Parsons & C. W. Wright
ATTORNEYS

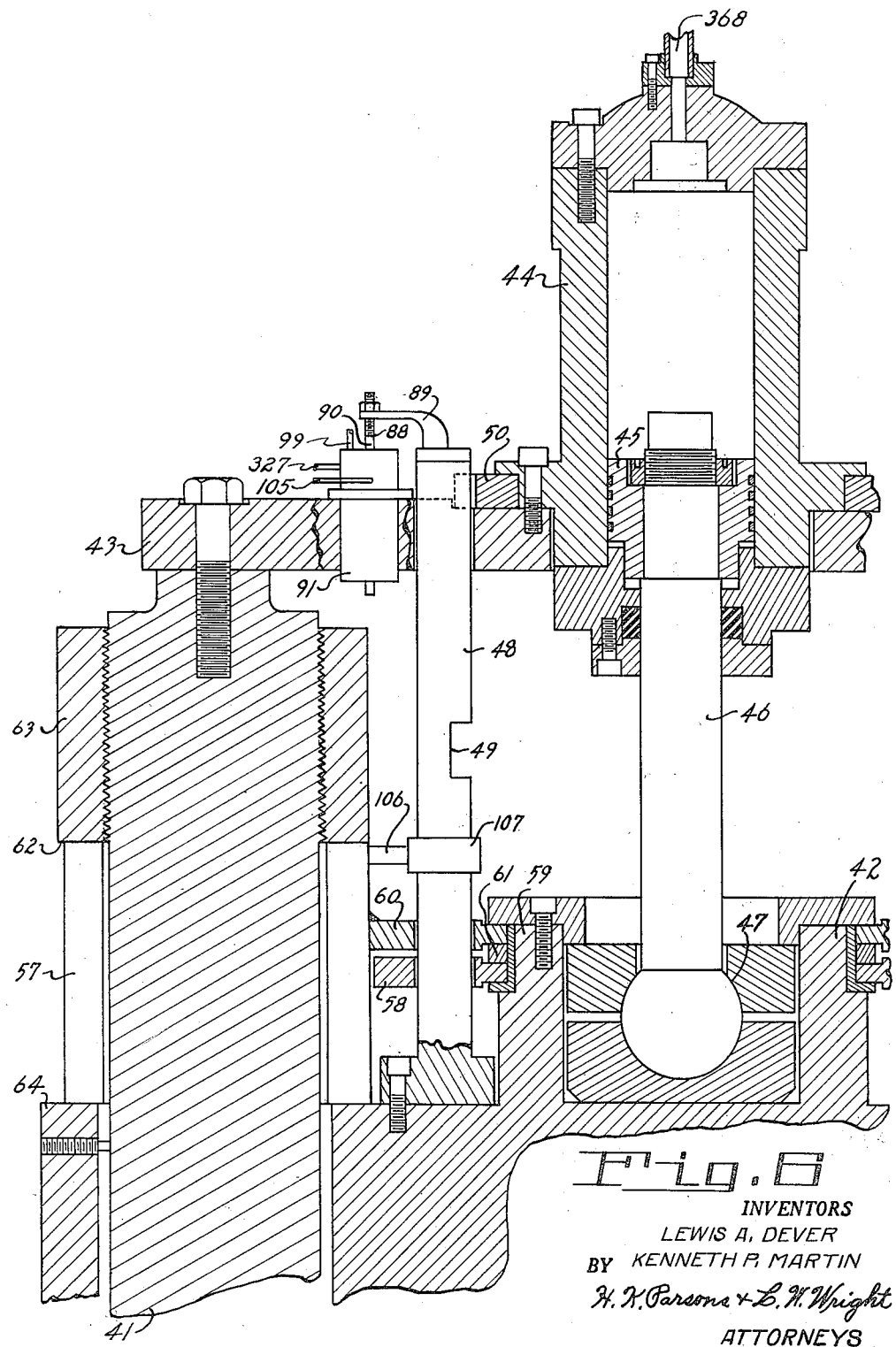

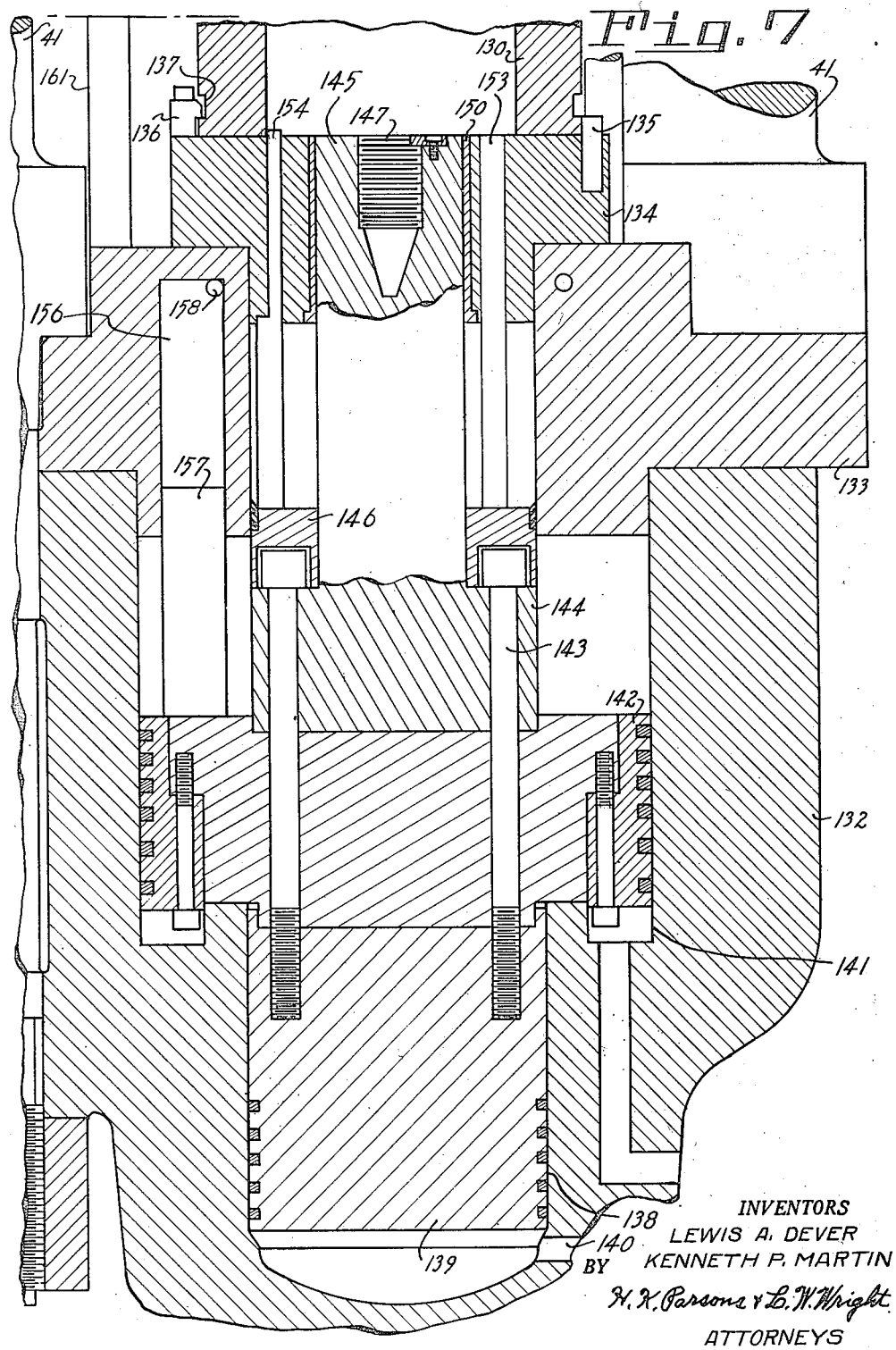

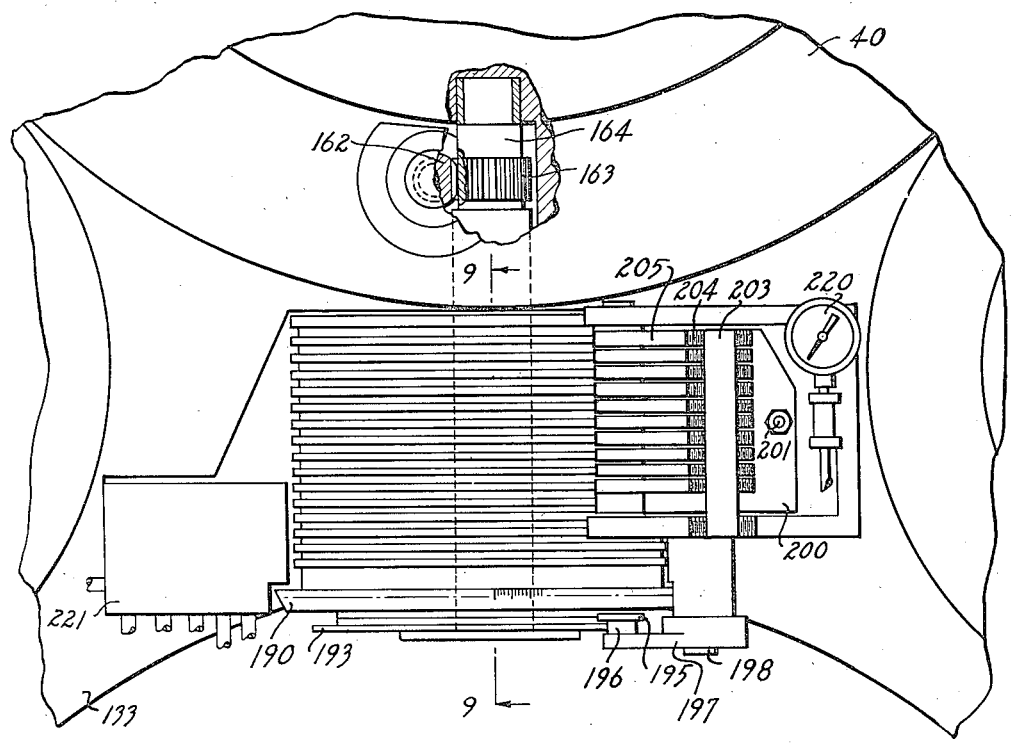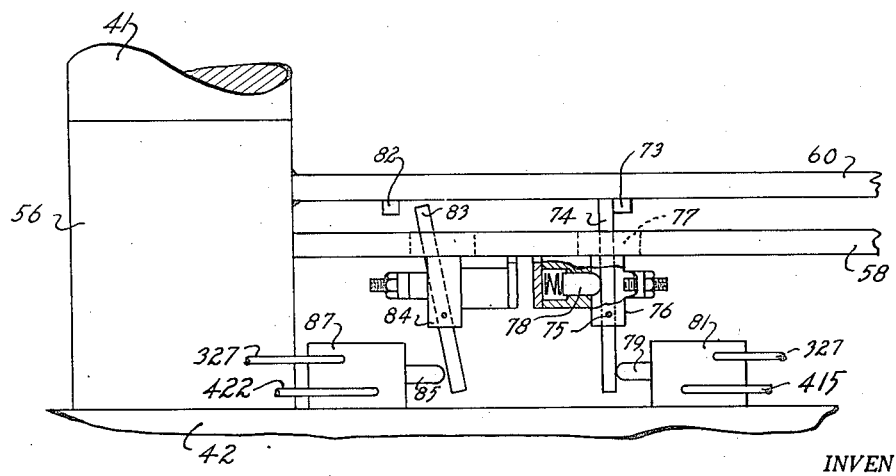

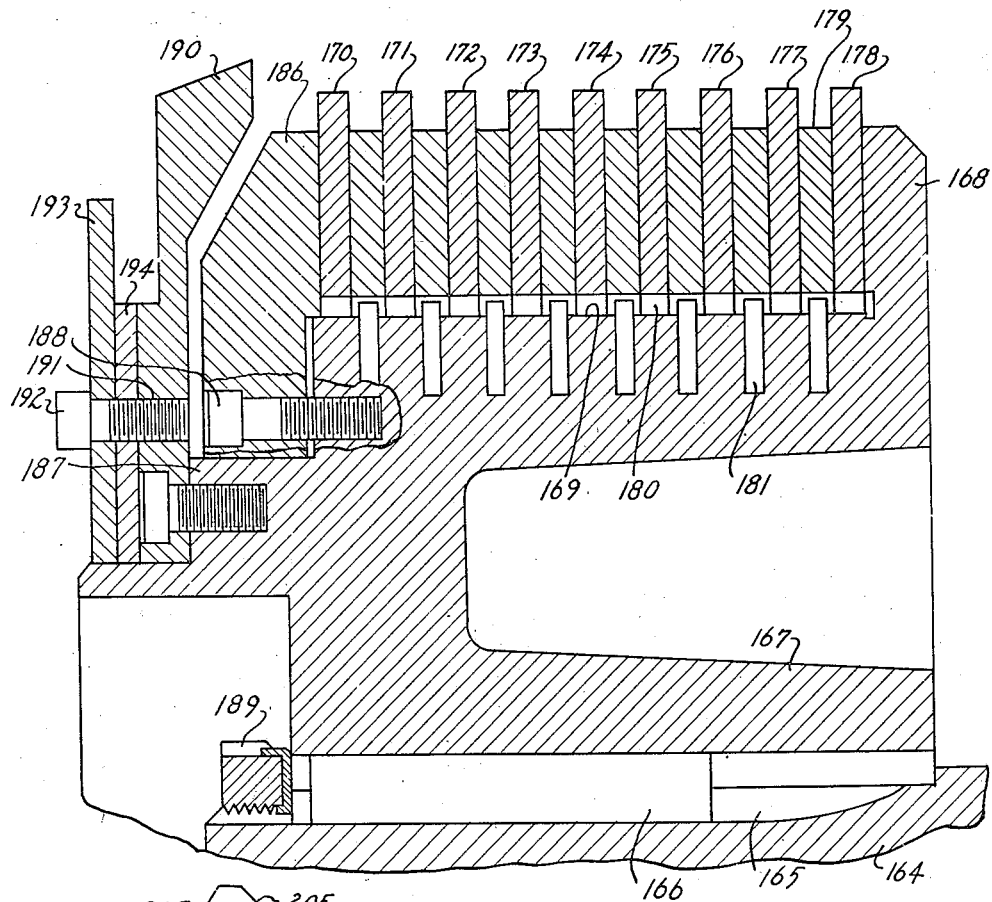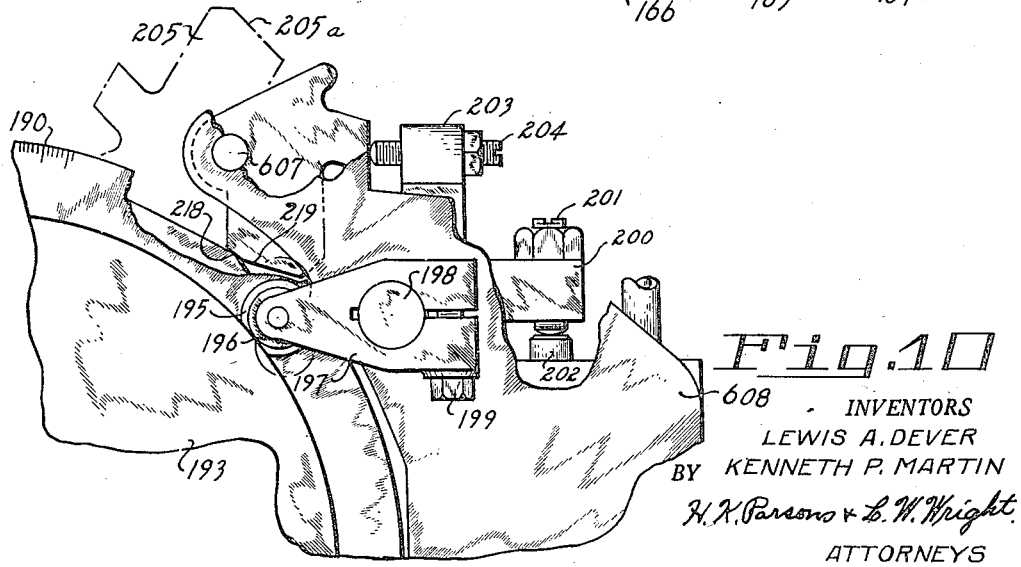

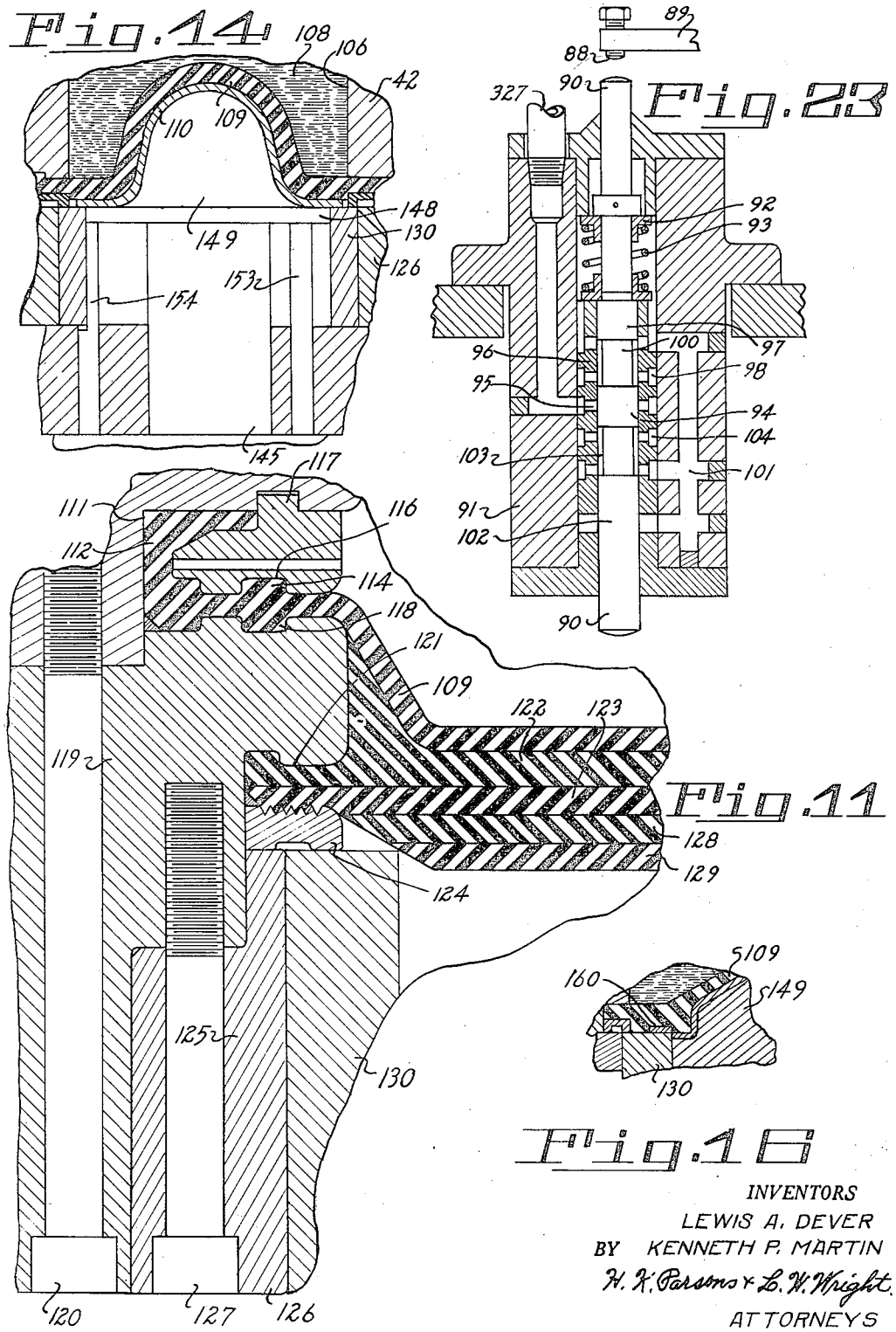

Oct. 16, 1956  L. A. DEVER ET AL  2,766,711
PRESS
Filed Aug. 9, 1950  14 Sheets-Sheet 9

INVENTORS
LEWIS A. DEVER
BY KENNETH P. MARTIN
H. K. Parsons & L. W. Wright
ATTORNEYS Oct. 16, 1956     L. A. DEVER ET AL     2,766,711
PRESS
Filed Aug. 9, 1950     14 Sheets-Sheet 10

INVENTORS
LEWIS A. DEVER
BY KENNETH P. MARTIN
H. K. Parsons + L. W. Wright
ATTORNEYS

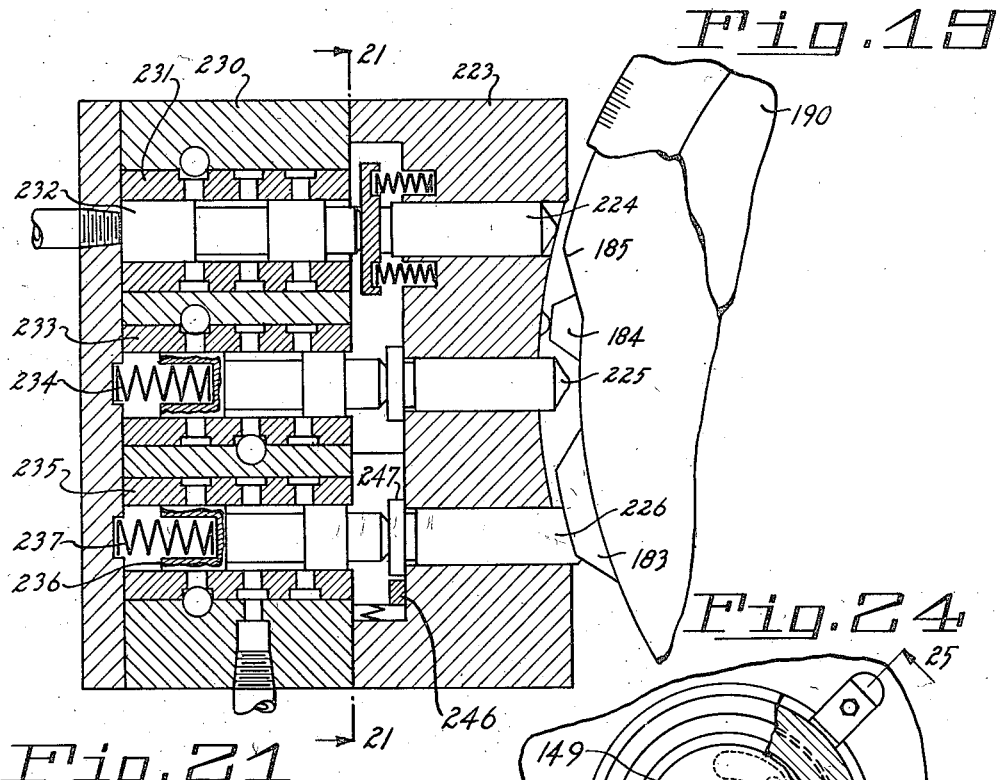
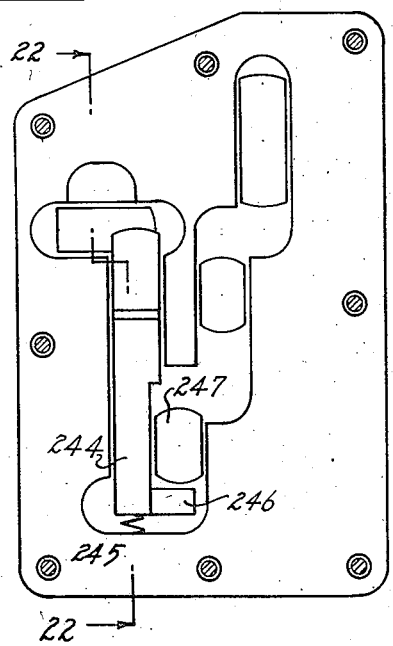
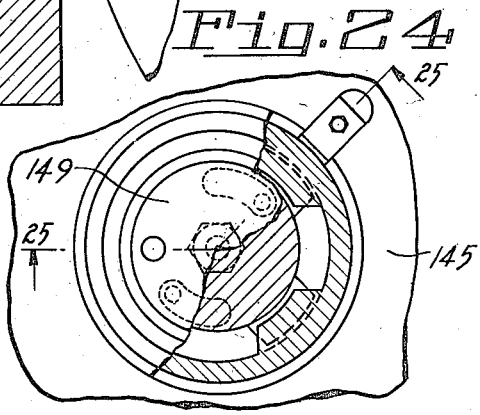
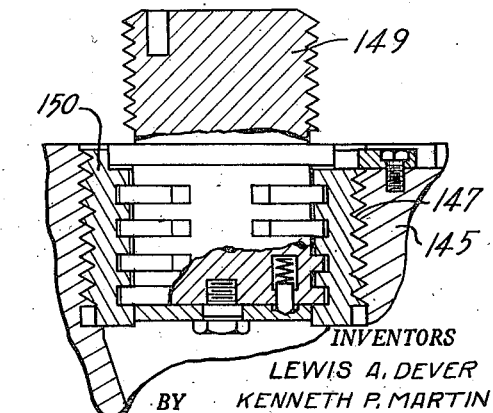

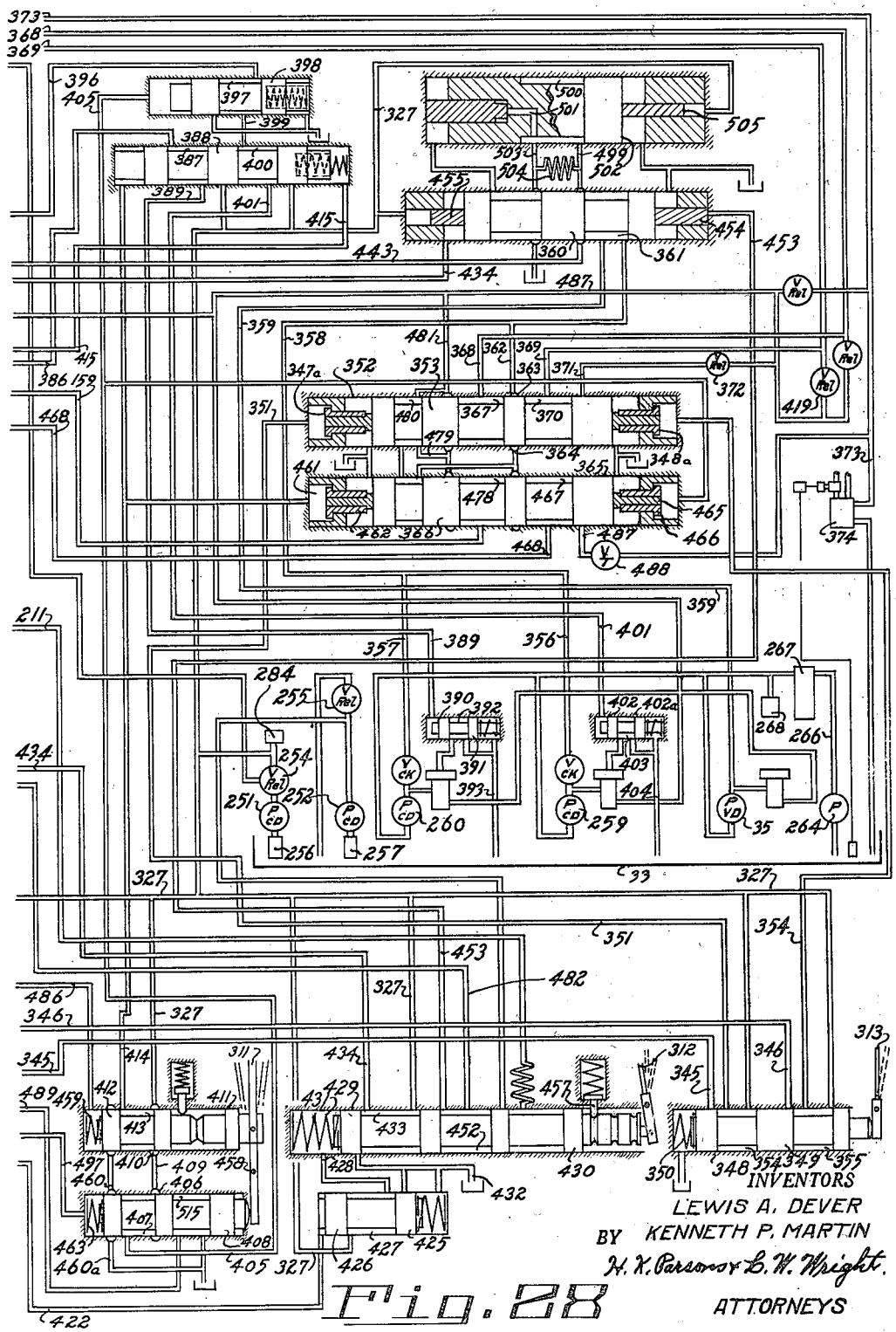

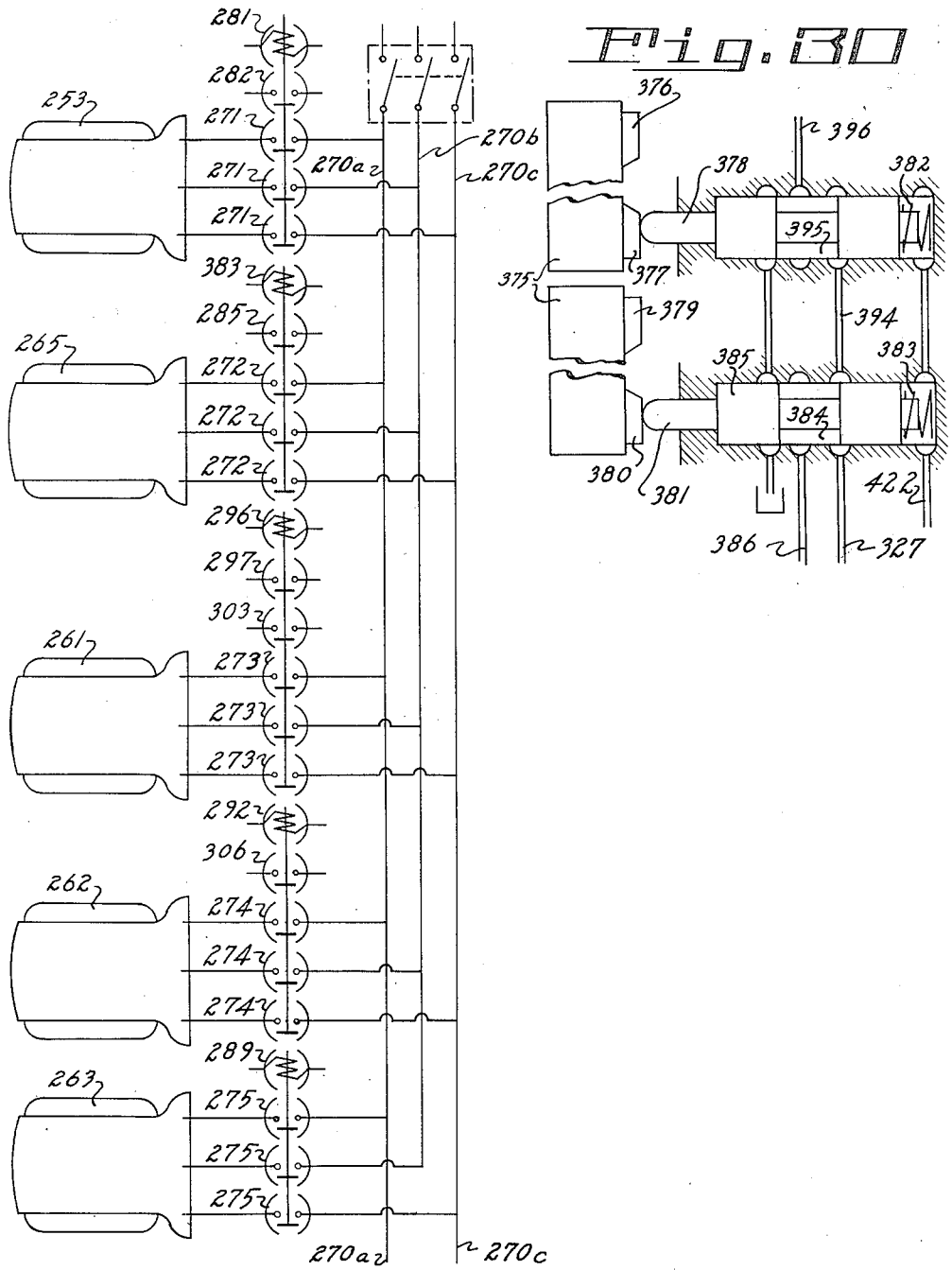

United States Patent Office 2,766,711
Patented Oct. 16, 1956

2,766,711

PRESS

Lewis A. Dever and Kenneth P. Martin, Cincinnati, Ohio, assignors to The Cincinnati Milling Machine Co., Cincinnati, Ohio, a corporation of Ohio Application August 9, 1950, Serial No. 178,528

8 Claims. (Cl. 113—44)

This invention relates to improvements in presses and has particular reference to an improved high pressure press mechanism for cold shaping or forming of deformable material such as metal sheets or blanks.

One of the objects of the present invention is the provision of an improved structure in which high forming pressures may be developed and in which the forming pressures and reactions shall be independent of the means for effecting relative opening and closing movements of the press elements.

A further object of the invention is the provision of an improved press structure in which the forming operations may be effected within a completely closed and locked forming chamber, insuring maximum safety and accuracy of functioning when high pressures are utilized while minimizing the overall bulk and power requirements as compared with previous presses of corresponding capacity in which the forming operation has been effected by relative movements of the massive forming and die holding elements.

A further object of the invention is the provision of an improved press capable of utilizing relatively low pressure positioning and locking means for the ram element of the press in conjunction with controlled minor high pressure actuable elements for effecting the actual shaping operation or operations.

An additional object is the provision of an improved press mechanism having substantially automatic control of sequential operation of the several elements of the machine including safety interlock mechanisms for definite determination of the several sequential functionings.

Another object of the present invention is the provision in a hydraulically actuable metal forming press of improved, adjustable, automatically operable mechanisms for determining the effective pressure variations and reactions of the die members on a work piece during forming thereof.

An additional object of the invention is the provision of an improved press mechanism for effecting both general shaping or forming operations and subsequent edging or cutting-off operations embodying automatic control mechanism for determination of the sequence and extent of said several operations.

The invention additionally contemplates the provision of an improved hydraulically operated press structure, utilizing a high pressure hydraulic actuating circuit for performance of the actual forming operations in conjunction with low pressure hydraulic control circuits for determination of the extent and nature of movements and forming operations of the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a front view of a press constructed in accordance with and embodying the principles of the present invention.

Figure 2 is a plan view of the press shown in Figure 1 with certain operating elements indicated in dotted lines.

Figure 4 is a similar diagrammatic sectional view as on the line 4—4 of Figure 1, illustrating the structure of one of the dome locking plates.

Figure 5 is a fragmentary sectional view on the line 5—5 of Figure 4.

Figure 6 is a fragmentary vertical sectional view on the line 6—6 of Figure 2.

Figure 7 is a sectional view on the line 7—7 of Figure 3, illustrating the actuating means for the movable forming die plunger.

Figure 8 is a fragmentary plan view of the control cam mechanism.

Figure 9 is a transverse sectional view of the cam mechanism on the line 9—9 of Figure 8.

Figure 10 is an enlarged front view of the cam controlled dog and follower mechanism for variable determination of the forming pressure.

Figure 11 is an enlarged detail sectional view illustrating one manner of clamping the flexible forming element in position as respects the pressure dome.

Figure 12 is an enlarged fragmentary detail view illustrating the dome lock safety pilot control mechanism.

Figure 14 is a corresponding view showing the relationship of the parts at the completion of the main drawing or forming operation.

Figure 16 is a corresponding view illustrating the final blanking or trimming of a formed work piece.

Figure 17 is a fragmentary view of the pressure connection between the pressure source and the movable dome element.

Figure 18 is an enlarged side elevation of the control valve block carrying the series of valve elements for cooperation with the automatic control cam mechanism of Figure 8.

Figure 19 is a vertical sectional view on the line 19—19 of Figure 18.

Figure 21 is a view as on the line 21—21 of Figure 19 with the valve block assembly removed.

Figure 23 is a vertical section through the dome operated safety pilot valve.

Figure 24 is a view partially in plan and partially in section of a reduced diameter adapter.

Figure 25 is a vertical section of said adapter on the line 25—25 of Figure 24.

Figure 27:
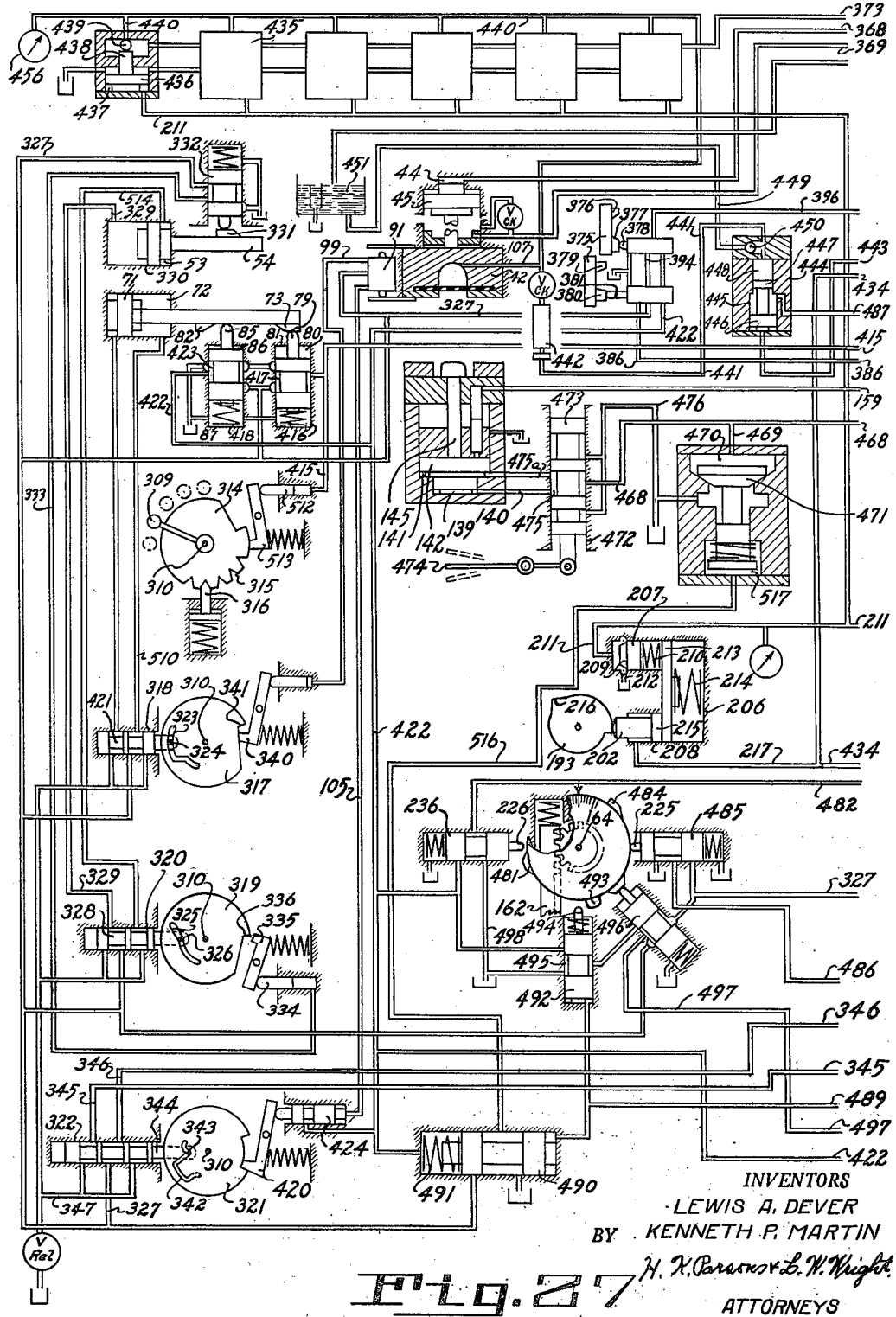

Figures 27 and 28 jointly constitute a diagrammatic view of the several hydraulic control and actuating circuits of the machine, together with diagrammatic indications of the cooperating mechanical parts or elements actuated thereby or for actuating control thereof.

Figure 29 is a diagrammatic view of the electric motors and power circuit controls therefor, and Figure 30 is an enlarged diagrammatic sectional view of the ram rate control valves.

The general machine structure is illustrated in elevation in Figure 1. For convenience of installation and utilization, there is preferably provided a pit 30 spanned as at 31 by I-beam supports or the like forming a part of the platform or flooring level 32. The lower portion of the machine depends into the pit which also provides suitable area to receive the motor-pump foundation block and hydraulic reservoir 33 for the drive motor or drive motors 34 and the aligned pump elements such as 35.

The particular pump 35 shown in elevation in Figure 1 has been indicated in diagrammatic view in the hydraulic diagram, Figure 28, as a variable delivery high pressure pump capable of developing a pressure of 3,000 to 5,000 pounds. For normal operating purposes, on a press of the size indicated, this pump may have, for example, a maximum capacity of twenty gallons, and its output varied below said maximum by adjusting the pilot wheel 36 which is retained in adjusted position as by the manually controlled lock device 37.

Suitable piping, designated as an entirety in Figure 1 by the numeral 38, conducts actuating fluid to the machine while the free flow reservoir return conduit 39 serves to return the fluid to the reservoir 33 for reutilization.

Mounted upon the supporting beams 31 is the main bed 40 of the machine having rising therefrom the columns 41 shown as four in number which provide supporting guides for the vertically reciprocable dome section 42. These columns are connected at their upper ends by the bolster plate 43 which, in turn, supports the cylinder 44 for piston 45 provided with the piston rod 46 engaged in socket 47 at the top of dome 42 to effect up and down movement of the dome. Carried by the dome are a series of rods 48 notched as at 49 for engagement by the locking ring 50 supported for rotation about the cylinder section 44. This locking ring, as shown in Figure 2, is provided with notches 51 which in Figure 6 are indicated as aligned with the rods 48 to permit of vertical sliding of the rods. When the dome, and thus the rods, are in raised position, however, the notches 49 are then brought into alignment or registry with the locking ring 50 which is then rotated so that the solid flange of the ring projects into the notches 49, locking the dome in raised position as indicated in Figure 2. For effecting the oscillatory movement of the locking ring into and out of locking position, use is made of a hydraulic motor mechanism including the cylinder 52 carried by the bolster plate 43 and containing a hydraulically actuable piston 53 for operation of the piston rod 54 coupled to the arm of lug 55 on the locking ring 50.

When the dome is in its lowered or forming position, as indicated in Figure 6, it is securely locked in place by the half-shoes 56 and 57. These are indicated as consisting of two sets, each four in number, the shoes 56 as indicated in Figures 2 and 4 being carried by a plate 58 rotatably or oscillatably mounted on the neck 59 of the dome unit, while the shoes 57 are correspondingly integral with or welded to a superimposed plate 60, likewise oscillatable on the neck 59 in opposition to the movement of plate 58. A spacing ring 61 intervenes the plates 58 and 60 to facilitate their free relative oscillation. As will be most clear by reference to Figure 6, when the shoes are swung inwardly into engagement with the columns 41 they ride underneath and tightly interfit with the lower surfaces 62 of the collars or nuts 63 carried by the upper ends of the columns while their lower edges bear against the shoulder 64 on the dome. As these elements are of relatively large and heavy construction anti-friction rollers, such as 65, are preferably carried by bearing blocks 66 set into the recesses 67 in the lower edges of the sleeves and riding on the shoulder 64 to insure tight interfitting engagement of the parts when in dome clamping position.

As should be evident, by reference to Figures 2 and 4, the swiveling of the plate members 58 and 60 permits of movement of the respective plates one in a clockwise and the other in a counterclockwise direction to bring the shoes into locking position as shown in Figure 4 or by reverse corresponding movements to unlock and release the shoes as respects column and collar engagement as is shown in Figure 2. This actuation of the clamping members can satisfactorily be effected as by the toggle links 68 pivoted to one of the shoes 56, and one of the shoes 57, and having their inner ends jointly pivoted as by pin 69 to the end of rod 70 having a piston 71 operating within the piston cylinder 72 suitably mounted on the dome 42 as indicated in Figure 2. When the piston is actuated toward the left, the toggles move the locking shoes into a released position as shown in Figure 2, while movement of the piston to the right will effect joint relative movements of the plates 58 and 60 for shifting of the shoes to lock the dome in lowered or forming position. These movements, it will be understood, are hydraulically effected as indicated in detail in connection with the portion of the hydraulic circuit shown in Figure 27.

For safety control of the proper cycle operation of the machine, the plate 60 is provided with an abutment lug 73 as shown in Figure 12 for engagement with the upper end of the actuating rod or link 74 intermediately pivoted as at 75 to bracket 76 secured to the underside of plate 58, the plate being provided with a slot at 77 to permit desired swinging movement of the lever whose upper end is normally urged in a clockwise direction about its pivot by the spring pressed plunger 78. When plate 60 is oscillated in clockwise direction and plate 58 in a counterclockwise direction for release of the clamps, it will be understood that bracket 76 moves toward the right and the lug 73 toward the left as viewed in Figure 12, causing the lower end of the lever member 74 to engage and depress spring pressed plunger 79 of valve 80 contained within the valve block 81 whose detail structure and operation, as hereinafter described, should be evident by reference to Figure 27.

Correspondingly, when the parts are moved to their locking position, lug 82 on plate 60 will engage the upper end of lever 83 carried by the bracket 84 on the underside of plate 58 and in connection with the movement of plate 58 will cause the lower end of the lever to depress plunger 85 of valve 86 contained in the valve housing 87 while the lever 74 will be moved into releasing position to disengage plunger 79.

By reference to Figure 6 it will be noted that when the dome is in its lowered position the adjustable abutment 88 on arm 89 carried by one of the rods 48 will engage and depress valve plunger 90 of the safety pilot control mechanism contained in the valve casing 91 mounted on the bolster plate 43, moving abutment bushing 92 to compress spring 93. This valve in its intermediate or neutral position, as shown in detail in Figure 23, includes a central spool 94 normally closing the pressure inlet port 95 of the valve bushing 96. It is further provided with the terminal spool portion 97 bounding the groove 100, which, as shown, couples the bushing port 98 of the pilot conduit 99 with a reservoir conduit 101. It has a second terminal spool or shoulder portion 102 bounding the valve groove 103 which also, as shown in Figure 23, couples the bushing portion 104 of the pilot conduit 105 with said reservoir conduit 101. Depression of the valve by abutment 88, as will be evident, moves the spool 94 downwardly so that the pressure port 95 is then coupled by the spool with port 98. Alternatively, when the dome is in raised position, the abutment 106 on collar 107 adjustably mounted on one of the rods 48 engages the lower end of the valve plunger 90, raising the same into position to couple the pressure port 95 by way of groove 103 with pilot port 104 and conduit 105 for energizing the latter.

Figures 3, 13, 15:
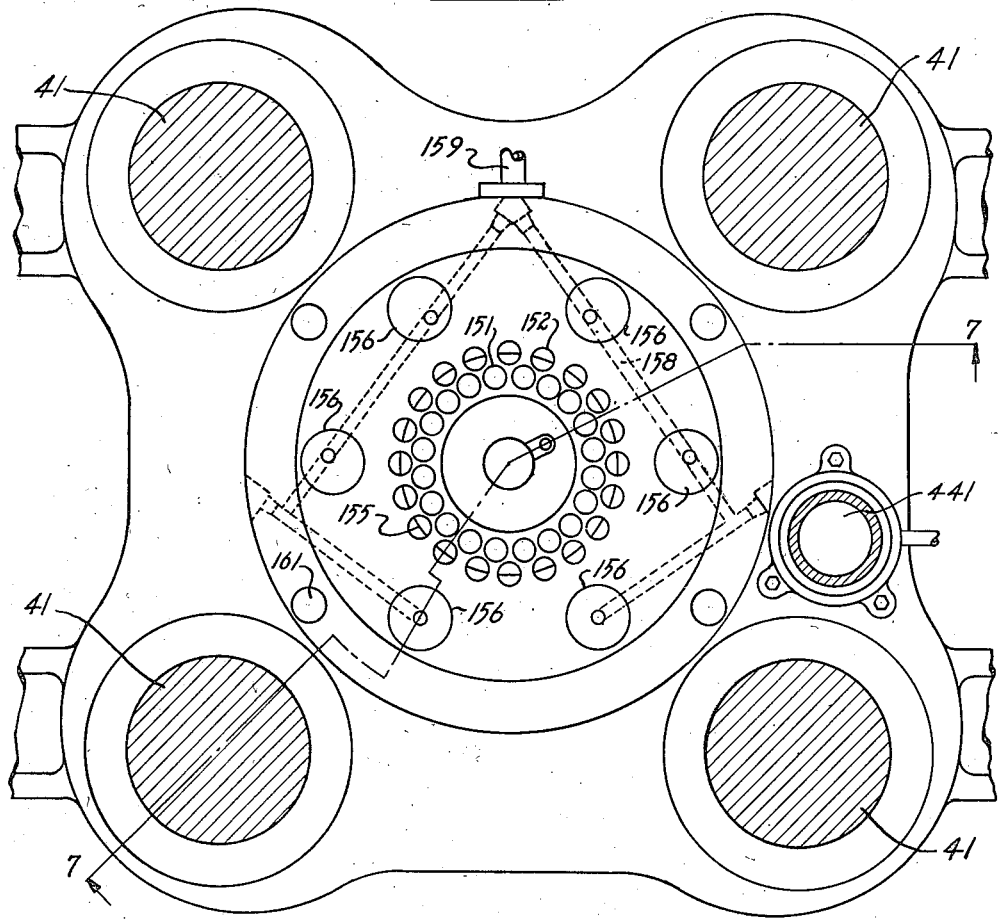
Figure 3 is a horizontal sectional view as on the line 3—3 of Figure 1.
Figure 13 is a fragmentary sectional view illustrating the relative position of the work piece and associate elements prior to initiation of the actual forming operation.
Figure 15 is a fragmentary view illustrating completion of a final edging operation as respects the work.
Figure 47:
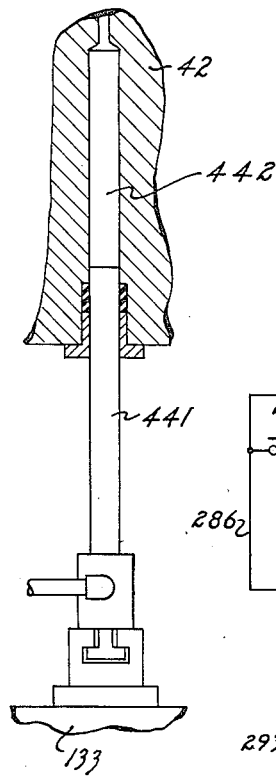
Figure 26:
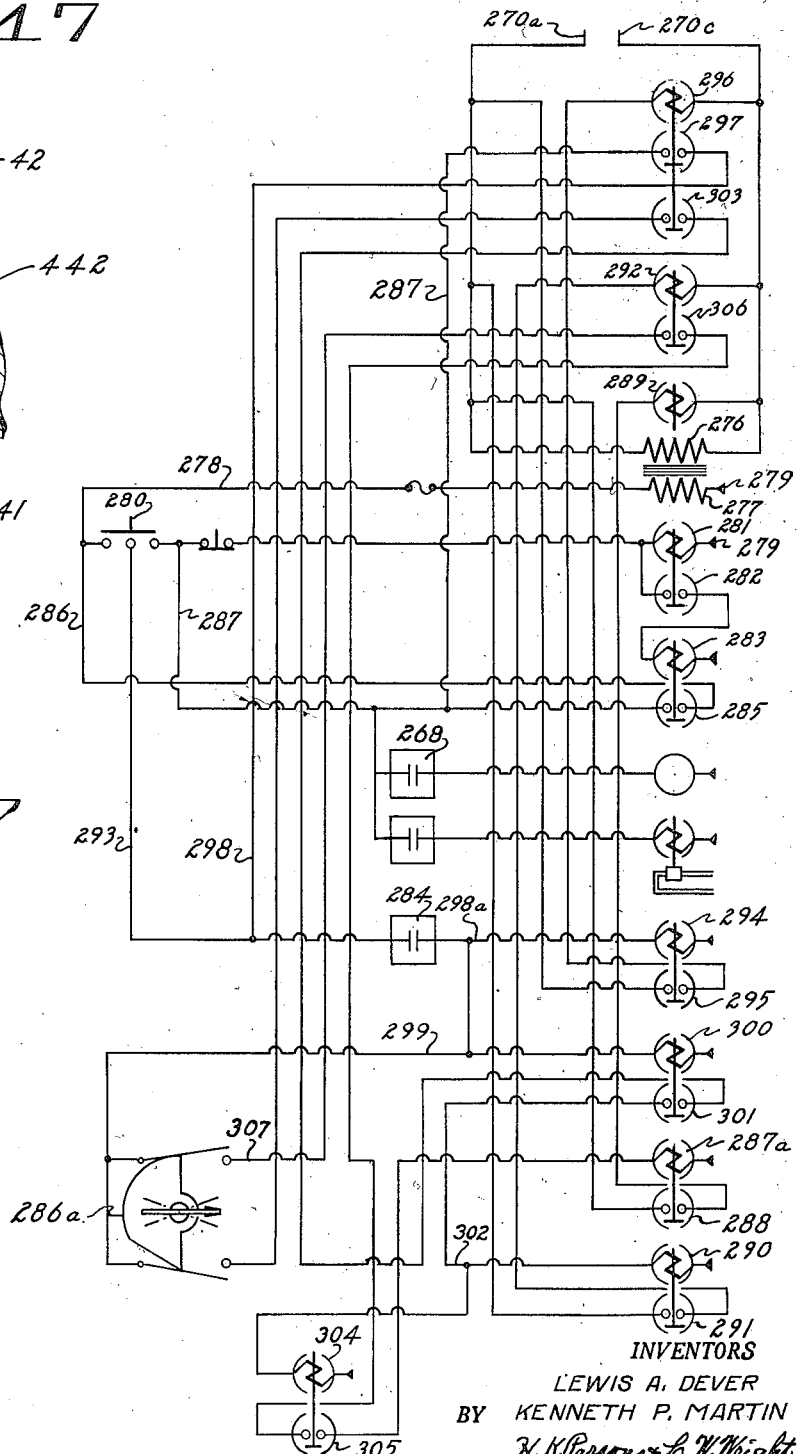
Figure 26 is a diagrammatic view of the electrical control circuits.
Figure 22:
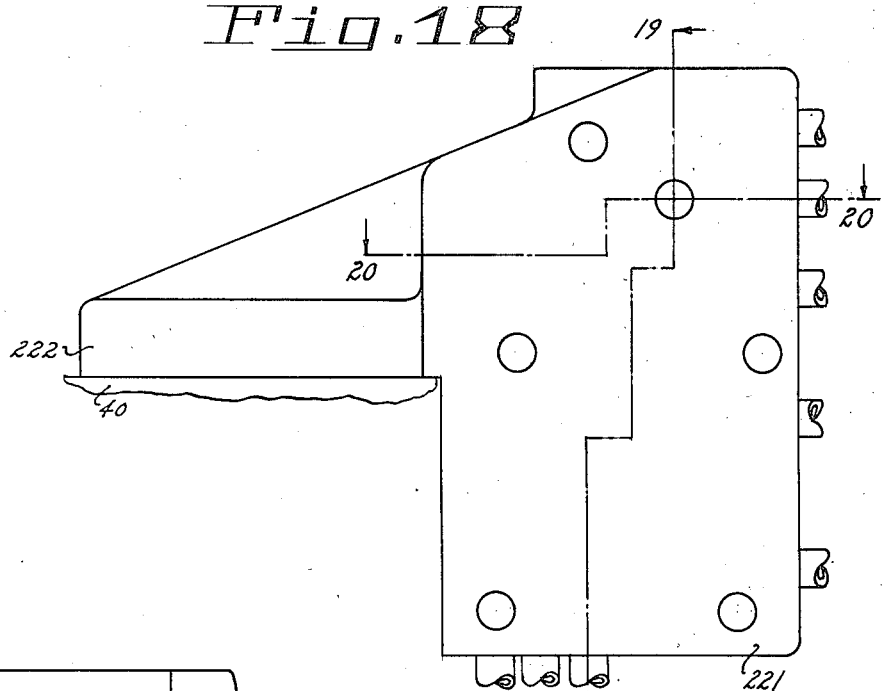
Figure 22 is a vertical section on the line 22—22 of Figure 21.

The general relationship of the forming elements of the present press mechanism have been semi-diagrammatically illustrated, as in Figures 1, 13, and 14 and in structural detail in connection with Figures 7 and 11.

The dome unit 42 is provided with the central chamber 106 having connected therewith a conduit 107 for controlling the supply and exhaust of the contained oil or like relatively non-compressible hydraulic medium indicated at 108. Sealing the lower portion of the chamber 106 is a flexible diaphragm 109 of rubber or corresponding yieldable impervious material. The area in question thus provides or takes the place of the usual female die member employed in ordinary press forming operations. Control of pressure initially created within the hydraulic mechanism 108 and suitable relief of volume or pressure during forming operations provides for ready control of the actual pressure reaction on the work piece, such as 110 to be shaped. The particular press illustrated in the drawings has been designed for utilization of pressures up to 15,000 pounds to the square inch.

In order that the liquid may be tightly sealed or retained as respects the lower end of the dome and to resist rupture during forming operations use may be made, for example, of the structure particularly illustrated in Figure 11. In this instance, the dome is shown as recessed at 111 to receive the terminal flange portion 112 of the main diaphragm member 109 which extends reversely in the recess and is provided with an annular rib 114 interfitting with corresponding configuration as at 116 on the locking ring 117 and with like configurations 118 in the upper edge of the diaphragm clamp ring 119 which is secured to the lower face of the dome by the heavy bolts 120. This ring is further provided with a seat 121 to receive the peripheral portions of the auxiliary diaphragm sections 122 and 123 which are, in turn, locked against member 119 by supplemental clamp ring 124 engaged by the shoulder portion 125 of the insert auxiliary clamp ring 126 held in place by bolts 127. To absorb wear on the face of the diaphragm members, additional flexible rubber wear discs 128 and 129 may be adhesively or otherwise secured to the underface of member 123 for actual direct engagement with the work piece 110.

It will be noted that the member 126 is an integral moving portion of the general dome unit 42, and in use projects downward in close parallel circumscribing relation to the removable work support or nest 130 which, in turn, circumscribes the peripheral edge 148 of the main die member or punch 149 which is vertically reciprocable with respect to the nest. In performance of a drawing or forming operation, the work blank 110 rests on the upper face of the nest member within the bounds of the clamp ring 124 and as the die is moved into the closed position, as indicated for example in Figure 13, the diaphragm designated as an entirety by the numeral 109 overlies the work piece sheet, exerting a uniform pressure on the entire area thereof and clamping the edge portions securely against the upper face of the nest.

Secured to or formed in the base 40 as shown in Figures 1 and 7 is the cylinder block 132 supporting the main platen 133 which carries the guide block 134 adapted to removably receive various interchangeable nest members 130. If desired, locating pins, such as 135, may be mounted in the block 134 for engagement with the nest 130 and hold-down clamps 136 carried by the block having shoulders engageable in groove 137 of the nest for securing the same in position. The block 132 is formed with the lower piston chamber 138 to receive the die plunger piston 139, being actuable by hydraulic fluid introducible through conduit 140. Above the cylinder 138 is a second cylinder portion 141 of larger diameter adapted to receive a second piston member 142, while secured to the pair of pistons as by bolts 143 is the hub or enlarged flange portion 144 of the die plunger 145. A retracting piston element 146 in the form of a ring or annulus circumscribing the member 145 rests against and is suitably secured to the upper face of the member 144. Member 145 is provided at its upper end with a threaded socket 147 to receive threaded tangs provided on the base of the die members 149. It will be noted that the member 145 slides in the guide bushing 150 carried by the block 134 and that due to the desirability of utilizing the machine in connection with varying diameters of die members 149, the diameter of the plunger 145 has been indicated as appreciably less than the inner diameter of the particular nest ring 130 illustrated. When the diameter of the die member is substantially equal to that of the plunger 145, the entire pressing power is exerted against the die member by the plunger. In the event, however, that larger diameter dies, such as shown in Figure 13, for example, are to be utilized, the block 134 may be formed with one or more concentric series of apertures or passages such as 151 and 152, indicated as an entirety in Figure 3.

The apertures 151 are adapted to receive circular pusher rods 153 while the apertures 152 are adapted to receive rods 154 which may be flattened at one side, as indicated at 155 so that they may extend as nearly as possible into close proximity with the inner face of the largest diameter nest ring utilizable in connection with the present invention. All of these rods are adapted to rest at their lower ends on the ring piston 146 so that as the unitary piston structure shown in Figure 7 moves upwardly, the plunger 145 will exert its force primarily directly upward against the central portion of the die member while the multiplicity of pins will engage, for example, the lateral flange portion 148 of the die as clearly shown, for example, in Figures 13 and 14 so that there will be an equal reaction of distributed force against the entire underside of the die member.

Additionally, formed in the platen 133 are a concentric series of small cylinders or chambers 156 to receive the stud pistons 157 bearing at their lower ends against the upper face of the piston member 142. A series of pressure conduits, indicated as an entirety by the numeral 158, are coupled by conduit 159 with a source of actuating pressure as hereinafter described. Introduction of pressure by way of conduits 158 and 159 into the cylinders 156 serve to effect rapid downward or retracting movement of the hereinabove described combination piston unit and die actuating plunger.

It will be understood that a machine of this general character may be utilized for drawing in a continuous operation articles of many and varied configurations, the simplest being that of a plain cup or domed work piece, such as indicated in the drawings, but due to the extremely high pressure exerted by the forming configuration of the flexible female pressure element, not only may general outlines of different sorts be produced but the material of the work may at the same time be caused to conform to any flutings, engravings, or other designs on the metal die or punch member, which will thereby be faithfully and accurately reproduced in the work. The nature of the operation is further such that by the pressure holding and retention of the outer peripheral portion of the blank against the nest member during the gradual advance of the punch into the pressure chamber of the dome, the material will be held at all times tightly against the die with a metal flow causing it to exactly conform thereto without appreciable stretching or changing of thickness of the material and with an automatic shrinking of the peripheral portion during the forming operation to prevent production of wrinkles or the like in the completed work piece. At the same time at the substantial completion of the forming operation, it is frequently desirable that during the unitary operation of the machine the non-utilized peripheral portion of the blank be sheared or cut off, leaving the work piece in its final form.

The manner of performance of this operation has been indicated in Figure 16, from which it will be noted by comparison, for example, with Figure 14 that the die element 148—149 has been permitted to recede slightly from its final extended forming position. In this instance, as the pressure is maintained, or, if desired, increased, at the termination of the forming operation and during the permitted recession of the plunger, the flexible diaphragm 109 under influence of the pressure will cause the formed work piece to follow up the receding plunger while the terminal edge 160 remains supported by the nest element. Assuming that the nest is provided in this instance with a sharp edge, this edge will act as a cut-off, severing the part 160 from the general formed article 110 as is particularly illustrated in Figure 16.

On the other hand, if a lesser recession of the punch member is permitted so that its lateral edge in receded position does not move below the edge of the nest, or if when in its final extended position and after cessation of forming movement pressure is maintained or accentuated in the dome chamber, the tension on the material due to the shaping operation will be relieved and the reaction of the pressure actuated diaphragm will be such as to eliminate any possible pre-existing fillet or slightly rounded portion between the peripheral edge 160 and the body of the formed article, thus producing a finished edging on the article as indicated in Figure 15.

To insure proper positioning of the vertically movable dome element prior to clamping thereof, the platen 133 is preferably provided with a series of rods or posts 161 adapted to contact with the flange 126 of the dome, limiting its downward movement.

For automatic control of certain of the operatons of the machine, there is coupled to and movable with plunger 145, a rack plunger 162 meshing with pinion 163 on control shaft 164 rotatably supported on base 40 and disposed at the front of the machine.

The general relationship of the control cam to the control elements of the machine is illustrated in Figure 8, details of the dog arrangement being shown in Figure 19, while the cam structure itself is sectionally illustrated in Figure 9. As particularly illustrated in Figure 9, the shaft 164 has a keyway at 165 to receive key 166 interengaged with the cam hub 167. This hub is of cylindrical form having the rearward abutment shoulder 168 and the cylindrical outer surface 169 adapted to receive a series of control cams, such as 170 to 178, indicated in Figure 9, together with the intermediate spacers 179. It will be noted that these cams and spacers are provided with internal notches or keyways 180 which when mounting are adapted to be aligned with the series of positioning pins 181 projecting from hub 167. By this construction the individual cam rings or discs and the intermediate spacing members 179 may be threaded or slid into position on the cylindrical portion 169, the pins securely holding the members 179 against rotation while the intermediate positioning of the cam discs permits of their rotary adjustment as desired for selective positioning of cam lugs or portions, such as 183, 184, and 185.

To lock the parts rigidly in position as a unit with the hub 167, use may be made of the clamp ring 186 fitted on the reduced shoulder portion 187 of the hub and drawn against the series of cam rings and spacers as by bolts 188 to lock the parts in position between shoulder 168 and clamp ring 186. The hub itself is secured on shaft 184 by nut 189. For determination of the rotated position of the hub and thus at all times the vertical position of adjustment or operation of plunger 145 a suitable dial 190 is bolted to the portion 187 of the hub. This dial, which has threaded sockets 191, receives bolts 192 for securing in position the control cam 193. The dial has a forwardly reduced portion and adjacent spacer as at 194 providing a guide track for flanges 195 on roller 196 which is disposed to follow the periphery of the cam. This roller is rotatably mounted on arm 197 carried by rock shaft 198, the arm being locked in desired rotatably adjusted position on the shaft by bolt 199. The shaft is additionally provided with rock arm 200 carrying the adjustable abutment screw 201 for engagement with plunger 202 of the dome pressure control unit.

Additionally, shaft 198 carries the arm or bracket 203 provided with a series or battery of adjustable stop screws 204, each individually located to engage the abutment surface 205a of an individual flipper dog 205. A series of such flipper dogs are pivotally supported on a shaft 607 carried by frame 608 rising from the base 40. When it is desired to use these dogs for automatic control of variations in dome pressure or release of compressed fluid from the dome, cam 193 may be removed from the hub 167, or rock arm 197 loosened and swung into upward position, so that the position of oscillation of shaft 198 and thus the position of arm 200 is determined by interengagement of one or more of the abutment screws 204 with corresponding dogs 205.

A direct actuated dome pressure control unit is carried by the bed in the valve housing 206, which includes the relief valve cylinder 207 and the piston control cylinder 208. Disposed within the cylinder 207 is a relief valve 209 actuated into closed position by spring 210 to restrict or shut off discharge from conduit 211 by way of valve to reservoir connection 212. The opposite end of spring 210 bears against the cross head plate 213 actuated toward the left as viewed in Figure 27 by spring 214 which is relatively heavy as respects spring 210. The other end of the cross head 213 bears against piston 215 integral with plunger 202 and movable in cylinder 208 in opposition to force of spring 214 as effected either by movement of abutment 201 as arm 200 is rocked or alternatively by suitable introduction of pressure into the forward end of the cylinder through pilot control conduit 217.

It will be evident by reference to Figure 27 that when the member 213 is in its extreme right hand position, as there illustrated, the pressure of spring 210 will be minimized, allowing valve 207 to yield for discharge purposes to a lower pressure existing in conduit 211 that when the member 213 is in a more left hand position and the spring 210 consequently caused to exert a greater pressure against the member 207. In Figure 27, the cam 193 has been shown of a general receding contour so that in clockwise rotation during a forming operation, the pressure on valve 207, and consequently by way of the hydraulic circuit, as hereinafter described, the effective pressure in the dome will gradually increase, although the volumetric content of the dome may decrease.

However, in the event that decreases as well as increases in the dome pressure are desired during a unidirectional forming operation, the forming cam surface 193 may have one or more lobes such as indicated at 216 so that the cam thus variably controls the forward and back movement of plunger 202, and consequently the pressure controls effected by valve 207.

The adjustable abutment screw structure particularly shown in Figures 8 and 10 may be employed primarily for initial set-up purposes or, when small lots of a given type of article are to be produced on the press. Normally, the abutments 204 are set in gradually receding series from front to rear and as the control shaft 164 rotates in a clockwise direction successive cam lugs 218 on the members such as 175 to 178 will engage the shoulders 219 on individual dog members, swinging the dog upward to snap it out of engagement with its respective abutment screw 204 when it will assume the position shown in dotted lines in Figure 10 and the arm 203 will swing in a counterclockwise direction until another abutment screw comes into limiting engagement with another of the control cam discs. Each such movement causes an incremental increase in relief pressure as respects conduit 211, a gage 220 serving to indicate the pressure existing in conduit 211. For performance of standardized operations or when an appreciable series of articles of given type are to be formed, either at one time or in lots at different times, the desired pressure conditions for most satisfactory forming operation can be determined by suitable settings of the several screws 204 and related positionings and the control cams, after which a special cam 193 may be developed and made up for the particular job. At any time when it is desired to produce this particular type of article, it is then very simple to apply in position the proper developed control cam 193 and the machine is immediately ready for automatic operation.

As indicated in Figure 1, the unit 608 for support of the automatic pressure control mechanism is mounted at the right underside of the automatic control cam.

An additional unit in the form of a valve block 221 is secured as by the bracket portion 222 to the bed 40, at the left of the control cam. This relationship of the parts is particularly indicated in Figure 18, while Figures 19, 20, 21, and 22 illustrate in detail certain of the control mechanisms contained within the block. The unit 221 comprises a first section 223 carrying the edge forming control plunger 224, the ram stop plunger 225, the dome pilot charge control plunger 226, the stripping control plunger 227, the dome charge limiting plunger 228, and latch 244. Associated with the unit 223 is the valve block proper 230 containing bushing 231 for valve mechanism 232 positionable by plunger 224, and second bushing 233 containing a valve mechanism actuable in one direction by spring 234 and in the opposite direction by the plunger 225, and a bushing 235 containing the valve 236 actuable in one direction by spring 237 and in the opposite direction by the plunger 226.

Figure 20:
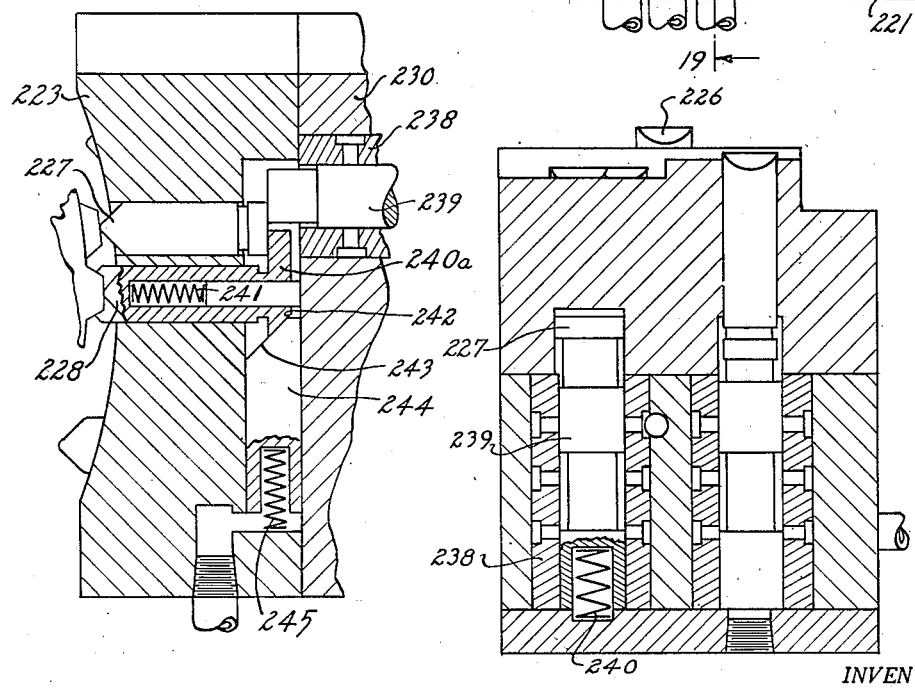
Figure 20 is a horizontal sectional view on the line 20—20 of Figure 18.

By reference to the section line 19—19 of Figure 18 and to Figure 20, it will be noted that the several plungers 224, 225, and 226 are disposed in staggered or offset relation in order that they may individually align respectively with the disc cams 170, 171, and 172 for independent actuating control by said cams.

Additionally supported in the block section 230 is the bushing 238 for the stripping operation controlling valve 239 normally inwardly actuated as by spring 240. Plunger 227 is so disposed in member 223 that a portion of its head engages the valve 239 for actuation thereof while a second portion of the plunger head contacts the head or flange 240a of plunger 228 which is normally outwardly urged by spring 241. This flange has a beveled portion at 242 interengaged with the cam surface 243 of latch 244 upwardly urged by spring 245. This latch member 244 has a laterally extending lug or latch portion 246 engageable when in raised position with the underside of head 247 on plunger 226 when the same is rearwardly urged as, for example, by dog 185 on the appropriate control cam, thus locking the valve 236 in its retracted position. It will be evident that inward urging of plunger 227 or 228 by appropriate cam dogs will cause 242 to wedge the latch member 244 downward to release valve 236 which will then be projected forwardly in the position illustrated in Figure 19 by action of spring 237. The functioning of these various valves is particularly illustrated and is hereinafter described in detail in connection with Figure 27.

It will be evident that the various machine operations and their sequential functionings are under hydraulic control, and for this purpose, in the particular form of invention shown, use is made of a plurality of hydraulic pumps as diagrammatically illustrated in Figures 28 and 29. A suitable reservoir 33 for the hydraulic actuating medium has been diagrammatically illustrated in Figures 27 and 28 in the form of a bracket character or pan element. To facilitate understanding of the operating circuit and avoid confusion by inclusion of a multiplicity of return leads various reservoir returns have been shown associated with the respective valve elements, each indicated as terminating in such a reservoir portion, it being understood that this is indicative of a general reservoir reception of exhaust or discharged flow, whether allowed to drain from portions of the machine direct into the reservoir or conveyed back thereto by extension of the piping indicated. In all instances, this symbolism in the diagram indicates waste fluid or fluid performing no further operative function, except that for economy it is collected and reutilized.

The essential means for supplying the pilot circuit for the hydraulic control system for the machine include primarily a pair of low capacity constant delivery pumps, such as 251 and 252 operable by the motors 253. These may have capacities, for example, of five gallons per minute and 1½ gallons per minute respectively, operating at established pressures in the nature of 300 pounds as determined by the relief valves 254 and 255 and securing their transmitted hydraulic actuating medium direct from tank 33 through the strainer connections 256 and 257. Additionally, for providing the necessary high operating pressures within the machine, use may be made of the variable delivery pump 35 and associated constant delivery pumps 259 and 260, operable respectively by the electrical motors 261, 262, and 263.

These pumps preferably have a capacity of about 20 gallons each and are supercharged from reservoir by pump 264 operable by motor 265 and having a potential capacity in excess of the demands of the pumps 35, 259, and 260, as, for example, a 70 gallon capacity. Fluid from this pump is supplied by way of conduit 266 containing filter 267 and pressure switch 268 to the intake side of the respective pumps.

Power for operation of the several motors is derived from suitable three-line source of supply, the conduits being indicated by the reference characters 270a, 270b, and 270c. Switch elements designated as an entirety by the reference character 271 for power to motor 265, 273 for power to motor 261, 274 for power to motor 262, and 275 for power to motor 263 of conventional type and solenoid or relay controls are provided. Additionally, the power conduits 270a and 270c are connected to opposite terminals of one side of a transformer 276, which leads 278 and 279 at the opposite side 277 of the transformer, provide a low voltage control circuit. The various direct connections to one side of the secondary of the transformers have been indicated by block triangles. The leads from the opposite side of the secondary and their controls have been diagrammed in full. When it is desired to start the machine, the normally opened circuit from 278 is completed by depressing starter button 280, closing control circuit to control relay 281 which reacts to close switch 282, completing the circuit to relay 283. Activation of 281 closes switch 271 to effect operation of the pilot pressure motor 253 and thus of the pumps 251 and 252.

Building up of this pilot pressure for the pilot or control circuits closes pressure switch 284. The activation of relay 283 closes switch 285 of shunt circuit 286, maintaining conduits 287 energized after release of the starting button 280. Energization of 283 also closes switch 272, actuating motor 265 of the supercharge pump 264 and rendering available necessary volume for utilization by pressure pumps 258, 259, and 260.

A selector switch is provided at 286a which in its centralized position interrupts possible circuit completion to control relay 287a for switch 288 controlling coupling of power to the relay 289 for switch 275 and motor 263. In this central position this selector switch also interrupts the circuit to control relay 290 for the switch element 291 determining activation of switch relay 292 for switch 274 and motor 262. It will be obvious that by moving the switch in one direction or another from the centralized position, as indicated, that either motor 263 or both motors 263 and 262 and their associate pumps may be made effective as desired, depending on the volume of hydraulic actuating medium desired for operating purposes.

Pressure switch 284 being closed, a second depression of the starting button 280 will activate conduit 293 and thus control relay 294, closing switch elements 295 to energize switch relay 296. Energization of this switch relay closes switch 273 to energize motor 261 and at the same time closes switch 297 completing the holding circuit by way of 298 after the starting button has been released.

Energization of 298a extending from switch 284 to control relay 294 also energizes line 299 including relay 300 for switch 301 in the general control line 302 for control relay 290, switch 303 having been closed by operation of the relay switch 296. If switch 286a is adjusted to couple 299 with 302, 290 will close switch 291 for effecting energization of motor 262, as well as motor 261 when the starting button is depressed. Likewise if switch 286a is set in its three-motor selector position, activation of relay 304 will close switch 305 while actuation of switch relay 292 closes switch 306, conditioning conduit 307 for actuation of control relay 287a and thus switch relay 289 and switch 275 for actuation of motor 263.

It will be evident that a simplified electrical control system has been provided for insuring initial starting of the pilot pressure motors to effect a conditioning and automatic setting of the several control portions of the machine prior to the availability of any actuating medium for effecting relative power shiftings or other high pressure operations and that by suitable subsequent manipulation the motor controls for the several supercharging and pressure creating pumps may be activated for desired performance of sequential machine operations.

It will be evident that on failure of the pilot system to build up or maintain the necessary pressure in switch 284 that the control system will be so deenergized as to cause automatic stopping of the motors for the several actuating pressure pumps.

Assuming that the several pumps have been placed in operation and that the press mechanically is in open position for reception of a work piece as structurally indicated in Figure 1 and diagrammatically in Figure 27, the following is a description of a characteristic manner of operation. The work piece 110 to be pressed or shaped to conform to the outline of the die 149 is placed in position, with its outer circumferential portion resting on the nest 130. Carried by brackets 307 and 308 on the bed 40 are the main control handles including the progressively shiftable cycle control handle 309 secured on the operating shaft 310 and the adjacent plunger control handle 311. These parts are at the left hand side of the machine for alternative operation by the left hand of the operator. Disposed at the right hand side of the machine is the inner dome charge control handle 312 and the outer interlock control handle 313.

It is first necessary to release the dome locks which retain the dome 42 in raised position in order that the same may be lowered against the nest and work. For control of the following described sequence of operations by progressive movements of handle 309 there are contiguously mounted upon the shaft 310 the detent cam 314 having a series of five notches as at 315 for cooperation with the positioning detent 316. Adjacent detent cam 314 is cam 317 controlling the form lock valve 318, and in sequence the cam 319 controlling the dome lock valve 320 and the cam 321 controlling the sliding valve plunger 344 of the dome pilot circuit selector valve 322. As indicated, the handle 309 has been moved from its initial position in which the dome is locked in raised position to a second or cycle initiating position as shown in full lines in Figure 27. It will be noted that in this position the cam 317 has a concentrically disposed slot portion at 323 receiving pin 324 on valve 318 so that the position of valve 318 is undisturbed. Cam 319, however, has an inwardly sinuous form of slot at 325 engaging pin 326 on valve 320, resulting in a partial movement of valve 320 toward the right.

The pilot pressure circuit conduit from the pump 251 has been designated throughout Figures 27 and 28 so far as it is uninterrupted or unaffected by valving mechanism by the reference character 327. As indicated in the lower left hand portion of Figure 27, when the valve 320 is shifted by partial rotation of cam 319, this pilot circuit is coupled by groove 328 of valve 320 with conduit 329 which extends to the left hand end of dome lock cylinder 330 in which moves piston 53. The movement indicated is that necessary to impart clockwise rotation to the locking ring 50 of Figure 2, bringing the notches 51 into alignment with the support rods 48 and releasing the dome for downward movement. In the event of any binding between the parts it may be desirable to actuate the interlock lever 313 to introduce pressure beneath the piston 45 slightly raising the dome to free the locking member. As piston 53 completes its stroke, lug 331 raises interlock valve 332, coupling pilot pressure conduit 327 with pilot conduit 333, actuating piston plunger 334 to move latch 335 out of locking engagement with shoulder 336 on cam 319. Until completion of the unlocking of the dome 335 and 336 has blocked movement of the general control rock shaft and handle 309. On release of latch 335 handle 309 may be moved to the next dotted position to the extent limited by interengagement of latch 340 with shoulder 341 on cam 317. As slot 323 is still concentric, no movement of valve 318 will be effected and as slot 325 is also concentric there will be no additional movement of valve 320. The rotation of the cam shaft will, however, shift 321 having the outwardly inclined slot portion 342 reacting on pin 343 on valve plunger 344, moving this valve to the left to couple pilot conduit 327 with conduit 345 and conduit 346 with a general reservoir connection 347.

Pressure thus introduced into conduit 345 is connected to a porting in the bushing 348 for the second selector valve 349 controlled by handle 313, while conduit 346 also terminates at the valve bushing 348. In the position of valve 349 normally effected by spring 350 the left hand conduit 351 extending to the bushing 352 of the dome position control valve 353 and the conduit 354 extending from the right hand portion of valve bushing 348 to the right hand end of the dome valve bushing 352 are both coupled with branches of the pilot circuit 327. This creates balanced pressure conditions on the bushing pistons 347a and 348a effecting a centralization of the dome position control or reversing valve 353.

With valve 322 conditioned as just described, however, a movement of the control lever 313 toward the right as viewed in Figure 28 will effect a left hand shifting of valve 349 coupling pressure conduit 327 by way of conduit 345, the valve groove 554 and conduit 351 to the left hand end of the dome valve while at the same time conduit 354 will be coupled through groove 355 with reservoir conduit 346.

The pressure in conduit 351 will react on the reduced end of the valve within the bushing, tending to force the valve to the right but at the same time the release of pressure in conduit 354 will allow bushing 348a to move with the valve to the right. Assuming that the pumps 259 and 260 are in operation producing a 3,000 pound actuating pressure, the discharge from the pump 259 will be through conduit 356 which joins with the conduit 357 receiving fluid from the pump 260 in the common actuating pressure conduit 358, the volume of fluid in 358 being dependent on whether one or both of the pumps 259 and 260 are in operation. At the same time discharge from pump 35 is through conduit 359. With the valve 360 in the position shown in Figure 28, the conduits 358 and 359 are connected by groove 361 rendering available the combined flow of the three pumps. This flow is connected by conduit 362 with groove 363 in dome valve bushing 352 and thence by conduit 364 with the bushing 365 of punch control valve 366.

The pilot pressure existing in conduit 327 holds the valve 360 in the right hand position shown. When the valve 353 is moved to the right, groove 367 will couple the pump pressure with conduit 368 introducing pressure into the top of cylinder 44 to move piston 45 and thus dome 42 downwardly. At the same time, conduit 369 is connected by groove 370 of valve 353 to reservoir conduit 371 and by way of relief valve 372 to reservoir return conduit 373 and by way of cooling unit 374 to the reservoir 33.

To control the rate of acceleration and deceleration of dome movement, there is secured to the dome, and movable therewith, the dog bar 375 carrying respectively near the upper and lower ends thereof the pair of beveled dogs 376 and 377 for cooperation with the plunger 378 and a second pair of dogs 379 and 380 for cooperation with the plunger 381. When the dome is in raised position, both plungers 378 and 381 will be depressed or moved toward the right as viewed in Figure 30 against the force of their actuating springs 382 and 383. In this position the pilot circuit conduit 327 will be connected by groove 384 of valve 385 under control of plunger 381 to conduit 386, and thence by groove 387 of valve 388 to conduit 389 to introduce pressure against the left hand piston end 390 of pump bypass or relief valve 391, it having a groove 392 effective when the valve is in its right hand position as shown to bypass pressure fluid from pump 260 by way of the conduit means 393 to the reservoir 33.

At the same time, when plunger 378 is in its dog effected right hand position, the pilot pressure fluid from 327 passes by way of conduit 394, groove 395, conduit 396 and groove 397 of valve 398, conduit 399 and groove 400 of valve 388 to conduit 401. This pressure in conduit 401 reacts on the left hand side of piston 402 of relief valve 402a, moving same to the right as shown in Figure 28 so that pump 259 is bypassed through groove 403 and conduit connections 404 to reservoir. The valve 398 is maintained in the right hand position as shown in Figure 28 by pilot pressure in conduit 405 supplied from groove 419 by way of valve groove 407 of the form-strip pilot valve 408.

The groove 407 is coupled by conduit 409 with the groove 410 in bushing 411 of valve 412 which is supplied with actuating pilot pressure from the chief conduit 327. At the same time, pressure from bushing groove 410 is supplied by way of groove 413 in valve 412 to conduit 414 extending to the piston chamber at the left hand end of valve 388. This pressure, however, is opposed by pilot pressure in line 415 supplied by way of plunger valve 416 whose plunger 79 is held in depressed position by dome lock actuated lever 74 as structurally indicated in Figure 12 and diagrammatically shown in Figure 27. This pilot pressure is from conduit 327 by way of groove 417 in valve 416. As the pressure on the valve toward the left is accentuated by the supplemental spring 418 the valve at this time will be in the left hand position illustrated.

From the foregoing it will be evident that when the control lever 313 is given a movement to the right as shown by the dotted lines in Figure 28, the necessary hydraulic connections of pilot and power circuits will be effected to initiate downward movement of piston 45, first at a rate determined by the setting of the individually employed variable delivery pressure pump 258 and subsequently automatically at increasing rates as the dome carried dogs respectively disengage the plungers 378 and 381 rendering available the full discharge from the pumps 259 and 260. Correspondingly, as the dome approaches its final position with its portion 125 overlying the work supporting nest and the flexible diaphragm 109 substantially engaging the work piece 110, the dome operated dogs will, according to their adjustment, simultaneously or successively cut out the effective reaction of the pumps 259 and 260, thus decelerating the rate of movement of piston 45 so that ultimate positioning of the dome at a rate determined by the setting of pump 258 is effected without shock. The handle 313 may be maintained in power coupling position, and the pressure conduit will discharge at a prescribed pressure such as 3000 pounds through valve 419 to reservoir or conduit 373, thus firmly retaining the parts in position.

As the dome reaches its final lowered position, abutment 88 engages and depresses plunger 90 coupling pilot circuit 327 by way of groove 100 with conduit 99. This releases latch 340, permitting movement of handle 309 and the several cams on shaft 310 to the next indexed position.

Movement of the shaft is then limited by latch 420. This movement of the handle causes cam track 323 of control cam 317 to move pin 324 and valve 318 to the right, coupling conduit 327 by way of groove 421 in the valve to the dome lock cylinder 72, actuating piston 71 to the right as viewed in Figures 2 and 27. This releases plunger 79, breaking the connection of circuit 327 to conduit 415.

As previously described, actuation of the piston causes the movement of the members 56 and 57 into dome locking position so that the dome is now rigidly mechanically held and lever 313 may be moved to the full line position shown in Figure 28. Completion of the movement of the dome lock controlling piston causes lug 82 (diagrammatically indicated as a cam element in Figure 27) to react through lever 83 and depress plunger 85, coupling the control circuit conduit 327 with conduit 422 by way of valve groove 423. The pressure in 422 reacts on plunger 424 to move its left hand free plunger portion to the left and release latch 420 so that lever 309 may be moved to its final position. When so moved, groove 342 of cam 321 reacts on pin 343, moving plunger 344 of valve 322 to the right, coupling conduit 346 to the reservoir connection 347 and conduit 345 to the control circuit conduit 327. At the same time, pressure in 422 reacts on valve 425 to move same to the right as viewed in Figure 28 so that its spool 426 shuts off pressure from 327 by way of groove 427 and conduit 428 to the cylinder 429 containing valve 430 which controls the pressure charging of the chamber 106 in the dome, leaving valve 430 free for movement to the left against the action of spring 431, the conduit 428 being connected by groove 427 with the reservoir conduit 432. Previously, this valve has been positively held to the right by the control pressure in conduit system 327 to prevent pressure charging of the dome.

In the position of the parts shown in Figure 28, it will be noted that the pressure conduit 327 is connected by groove 433 of valve 430 and conduit 434 to react against piston 208, moving cross head 213 to the right so that relief valve 207 exerts but slight throttle action as respects the conduit 211. By reference to Figure 27, it will be noted that the conduit 211 has a number of branches corresponding in number to the number of pressure discharge valves 435 which may be of desired construction, but, as indicated, include the large piston 436 in the cylinder 437. The pressure reacting on this cylinder forces upwardly the plunger 438 bearing against the ball or relief valve 439 of the dome pressure conduit 440. The ratios are preferably of the nature of 50 to one so that a 300 pound pressure in line 211 will be sufficient to hold the valves 439 seated until the pressure in conduit 440 rises to a maximum of 15,000 pounds. It will be understood that the variable positioning of the valve 207 under control of the cam 193, the dog elements such as 216 or otherwise may serve to vary the pressure as desired according to the particular operation being performed by the machine, but in any event a relatively light pressure in the conduit 211 will maintain very high actuating pressure in conduit 440, its coupled conduit 107 and the pressure dome itself.

The actual dome actuating pressure fluid for building up of the dome pressure is supplied by way of conduit 441 and a trombone type pressure connection 442 to the dome as indicated in Figure 17 to avoid use of flexible conduits or the like in view of the high actuating pressures employed. This pressure is supplied either directly or indirectly by the pump 35 by way of conduit 359, valve groove 361 and conduit 443. As indicated, the conduit 443 has been shown as coupled to the pressure amplifier 444 having a large cylinder 445 for the impelling piston 446 and the smaller compression piston 447 operating in cylinder 448 with which the conduit 441 is coupled. A supply pipe 449 controlled by check valve 450 is shown extending from the auxiliary reservoir 451 for effecting a gravity feeding of the hydraulic compression medium to the compression chamber 448.

For control of introduction of the pressure medium into the dome chamber 106, handle 312 is moved to its extreme right hand position, shifting valve 430 to the extreme left hand. In this position the pilot pressure conduit system 327 is connected by way of valve groove 452 with conduit 453 extending to piston 454 at the right hand end of valve 360. It will be noted that this piston is of larger diameter and thus greater effective area than the piston 455 at the opposite end of the valve which is continuously acted upon by pressure in 327.

Due to the excess area, introduction by pressure against the greater area piston 454 will shift valve 360 to the left coupling the pressure conduit 359 from pump 35 with conduit 443. As has been mentioned, this conduit may either be directly connected to the dome inlet conduit 107 by way of 441 or may be used to move piston 446 of the intensifier 444. The dome control lever is held in right hand position until the desired pressure in the dome is established as indicated by gage 456 when the lever is shifted to its intermediate or neutral position where the valve is held by the detent 457. At this time the pressure reacts on the flexible diaphragm closure for the dome to cause the diaphragm to bear against the entire upper surface of the work piece 110 with a uniform pressure, firmly holding the peripheral portion of the work piece against the nest member with its central portion either overlying or in contact with the upper portion of the die member 49, depending on the particular position selected for the die member with respect to its retracted plunger 145.

The machine is now conditioned for the actual forming operation which is under control of the plunger control handle or lever 311. Movement of this lever from the neutral position shown in full lines in Figure 28 toward the left as there illustrated will swing the lever in effect about the intermediate pivot 458 so that upper valve 412 will be moved to the left against the force of spring 459 shutting off communication between pilot pressure conduit 327 and conduit 414 which is then connected to the reservoir connection 460 relieving pressure in chamber 461 which reacts against the end of valve 366 and the centralizing bushing 462. At the same time spring 463 holds valve 408 to the right to block the reservoir connection of conduit 414 but without blocking the flow from 409 through 405 to the piston 465 and bushing 466 at the right hand end of valve 366. This will cause shifting of the valve 366 toward the left, coupling conduit 364 by way of groove 467 to conduit 468 which has a branch 469 extending into the upper chamber 470 of the relief or dump valve 471. The conduit continues to the valve bushing 472 containing valve 473 whose position is selectively determined by the control lever 474. In the intermediate position of the lever shown in Figure 27 the groove 475 connects conduit 468 with the conduit 140 communicating with the lower piston element 139 for the plunger 145. It also couples 468 with conduit 475a extending into the second or outer cylinder 141 for the piston 142. With this adjustment the operating pressure for the plunger is therefore acting against both piston areas effecting maximum lifting pressure as respects the plunger 145. If the lever 474 is moved to its lower position valve member 473 will be raised connecting 140 with reservoir conduit 476 and pressure with cylinder 141 only so that there will be a lesser power applied with greater potential rate of movement of the plunger. Conversely, if the lever 474 is moved upwardly valve 473 will be moved downwardly coupling 477 with reservoir conduit 476 and the pressure conduit 468 through 140 to direct its action against the smaller area piston 139 by which a lesser power effect but more rapid rate of movement is attained.

During such movement the pistons 157 discharge through conduits 158–159 back to groove 478 of valve 366. As this valve is now in its left hand position the discharge fluid is coupled by way of conduit 479 and groove 480 of valve 353 to reservoir conduit 481.

The upward movement of plunger 145, as is well understood, will deform, mold, or shape the work piece 110 in that the flexible diaphragm holds the work piece yieldingly under heavy pressure against the punch causing the work to conform to the surface of the die member 149 as the same advances while the uniform distribution of pressure and edge holding the material creates a restraining pressure reaction on the work so that it is drawn into shape without fracture, wrinkling or the like. It will be understood that the diaphragm and pressure medium within the dome are compressed by upward movement of the die and work piece, necessitating a decrease in volume of the contained hydraulic compression fluid or material when the pressure exceeds the prescribed amount such as 15,000 pounds which the machine is designed to develop. This may be effected by automatic yielding of the valve 209 to the pressure built-up in the release valve holding conduit 211 or, if preferred, may be automatically controlled by the contour formed on the periphery of the control cam 193 reacting on plunger 202, it being understood that the rack bar 162 moves upward in synchronism with and actuated by the die plunger and effects proper controlling rotation of the cam shaft 164. Correspondingly, pressure controls may be effected by the operation of the cam lugs with respect to the trip dogs 205 as previously described, particularly in connection with Figures 9 and 10. It will be evident that this forming operation is completely under control of lever 311, continuing so long as this lever is held toward the left, it being capable of being stopped at any desired point by shifting of the lever to its initial neutral position.

The maximum pressure which can be built up in the dome is determined by the pressure in line 211 determined by the resistance effected by the valve 209. In Figure 27 the parts are illustrated in the position they occupy at the start of the forming cycle with the high point of cam 193 engaging plunger 202 which controls the cross head 213 for minimum initial effective pressure within the dome. It will be understood that as the punch rises, compressing the diaphragm 109, that this will increase the dome pressure if the volume in the dome remains constant.

The initial setting shown, however, of valve 209 is such as to allow volumetric escape of the hydraulic medium while maintaining constant pressure. It is usually advantageous, however, as the forming strain on the work piece increases that a higher resistant pressure be built up in the dome. For this reason the cam 193 has been indicated as having a spiral receding contour permitting gradual closing of the valve 209 under the action of spring 214. As has been mentioned, this cam is normally designed according to the particular requirements of an individual forming operation, taking the place of the flipper dog control particularly illustrated in Figure 8. This structure has the advantage that if a temporary reduction of pressure is desired at any point during the operation, the cam may be provided with a rise such as shown at 216 for moving the member 208 outwardly, and thus decreasing the relief value of valve 209. With the construction shown the operating pressure in the dome or female portion of the die may therefore be controlled automatically as desired for increases or decreases of dome pressure during a single unidirectional forming operation as effected by the punch movement. This portion of the pressure control is, of course, dependent on creation of the pressure directly by the punch movement. If it is desired, however, either during or at the termination of the forming operation to effect an increase in dome pressure, this may be automatically accomplished by the dog 481 on the control cam hub unit 167 carried by shaft 164 which is engageable with the dome pilot control valve plunger 226. When this plunger is moved rearwardly, as viewed in Figures 19 and 27, by the action of the dog, pilot line 422 is coupled with conduit 482. If the dome valve is in its neutral position, the introduction of pressure through 482 will be coupled through 452 to conduit 453, reacting on piston 454 to move valve 360 to the left, causing additional actuation of the pressure intensifier to create a high pressure condition in the dome. This insures a maintained high pressure even though movement of the plunger has been discontinued either by movement of the forming control lever 311 to a neutral position manually or by automatic stopping of the movement of the plunger. This automatic stopping is effectable by engagement of the dog 484 on the control cam unit with the ram stop plunger 225 rearwardly actuating the valve 485. This movement of the valve serves to energize conduit 486, reacting on valve 412 to couple pilot pressure conduit 327 with conduit 414 reacting on bushing 462 to move the form controlling valve 366 to a neutral position.

For reversal of movement of the plunger, the handle 311 is mounted for an additional clockwise movement shifting valve 408 to the left as viewed in Figure 28 connecting conduit 405 with the reservoir connection 460a which relieves the restraining pressure against bushing 466 so that the punch control valve 366 now under influence of pressure in line 414 may have an additional right hand movement from the neutral position illustrated. When so shifted, the normal pressure conduit 468 will be coupled through reservoir conduit 487, then through throttle valve 488 to the reservoir conduit 373 and the pressure conduit 364 by way of groove 478 to conduit 159. The punch plunger 145 will then be forced downward at a rate determined by the setting of the throttle valve 488.

This movement of the control lever 311 into stripping position couples pilot conduit 409 with conduit 489, introducing pressure against valve 490, trying to move same to left as viewed in Figure 27. This movement, however, being resisted both by the pressure in 422 and the force of spring 491, the valve remains stationary. Pressure, however, is simultaneously introduced against the piston portion of valve 492, moving same inward against the cam dog 493. As the plunger 494 of valve 492 rides off of dog 493 its groove 495 couples the pilot circuit conduit 422 by way of valve 496 with conduit 497, whose pressure reacts on the stripping control valve 408 restoring it to neutral position and stopping the downward movement of the punch. This is particularly desirable when an edging operation, such as indicated in Figure 15, or a cutting off operation such as indicated in Figure 16, are to be performed. It will be understood that, in either event, the dome pilot charge dog 481 may be so set as to effect the necessary increase in pressure in the dome for the final edging or cutting off operation. The pressure reaction against the strip or plunger reverse controlling valve effecting its neutralization prevents a complete retraction of the plunger prior to necessary pressure relief in the dome and thus prevents any possible deformation of the shaped article except for the controlled edging or cutting off operation.

The forming of the article having been completed, the dome pressure control lever 312 is shifted in a counterclockwise direction, positioning the valve 430 to the discharge position indicated in Figure 28. In this position the pilot pressure conduit 327 is coupled with conduit 434, forcing the cross head 213 to the right as viewed in Figure 27 and relieving the pressure in conduit 211 so that the relief valves 439 in valves 435 may open and allow discharge of the dome pressure fluid back to reservoir through the return conduit 373. At the same time, conduit 453 coupled with the right hand end of valve 360 is coupled through 482 by way of the valve 236 to reservoir by way of conduit 498. This permits movement of valve 360 to the right, shutting off any pressure coupling between 358—359 and the dome pressure conduit 443.

During operation of the machine, pressure in 443 has reacted through 499 through 500 and conduit 501 to move valve 502 to the right, closing off reservoir connection 503. It has also been blocked by valve 360. The movement of valve 360 to the right which now takes place opens 503 to reservoir so that there can be a bleed or restricted flow from 499 to reservoir through the hydraulic resistance 504, thus lowering the pressure in conduit 443. When this drops to a relatively low pressure, such as 150 pounds, the permanent pressure in the pilot conduit line 327 reacting on piston 505 of the valve 502 will be sufficient to shift the valve to the left, providing an unrestricted discharge of fluid from the intensifier by way of conduit 443 and groove 500 to reservoir. The various steps in automatically controlled cycle sequence for raising of the dome to its initial elevated position may then be effected in reverse order to the closing of the dome under control of handle 309 as it is moved in a counterclockwise direction. Moving this lever from position 4 to position 3 will have no effect on valves 318 and 320, but the slot 342 in cam 321 will react on valve 322, moving the latter to the left from the position shown in Figure 27 coupling pilot pressure conduit 327 with conduit 345 of interlock or selector valve 349, while coupling conduit 346 with reservoir. Further shifting of handle 309 counterclockwise to its No. 2 position causes slot 323 on cam 317 to move valve 318 to the left from the position previously occupied, or in other words, to the position indicated in Figure 27, coupling pressure conduit 327 by way of 510, retracting the dome lock piston 511 to its left hand or released position so that the dome locks are now open as shown in Figure 2. By this movement valve 86 is permitted to rise, connecting control circuit conduit 422 with reservoir, releasing the hydraulic holding urge against valve 490 so that introduction of pressure into conduit 489 may be effective to move valve 490 to the left and also discontinuing the effective control circuit connections as respects the dome pilot edging valve and strip stock valve. This also discontinues pressure against valve 425 so that its spring may restore it to the left hand position indicated in Figure 28. Movement of this valve recouples pressure conduit 327 by way of conduit 428 with chamber 429 so that the dome valve is forced and held in its discharge position.

The dome lock in its completely open position has also depressed plunger 79 coupling 327 with conduit 415. Pressure in this conduit reacts on plunger 512 to release latch 513 so that the handle 309 may be sequentially shifted to a number 1 position. Pressure in this conduit 415 also reacts on valve 388 for effecting its left hand positioning for conditioning of the pump control circuits for the dome elevating piston 45.

The dome locks having been completely released and the circuit suitably continued, the movement of lever 313 to the right, shifting valve 349 to the left, effects the necessary circuit couplings from 346 to 354 and from 351 to 345 for shifting the dome control valve 353 to the left as viewed in Figure 28 so that the dome may rise. At this time the lever 309, due to release of latch 513, has been moved to the No. 1 position as shown in Figure 27 of the drawings, this movement being restricted by the latch 420. During the upward movement of the dome piston 45, it will be apparent that the respective control dogs 379, 378, 377, and 376 inversely to their previous operation control the successive cutting in of the pumps 259 and 260 for effecting rapid movement of the piston 45 and dome in the intermediate portion of the stroke and successive slowing down movements by by-passing the pump flows as the piston approaches its upper limit of movement.

When the dome is entirely raised, abutment 106 on rod 48 contacting with the lower end of valve rod 90 (see Figures 6 and 23) will move the rod 90 upward against depressing force of spring 93. This upward movement of the rod 90 will couple pressure conduit 327 with conduit 105 shifting the control plunger 424 inward to release latch 420. Handle 309 may now be shifted to the S or starting position during which movement slot 325 in cam 319 reacts on valve 320, shifting same to the left to couple pressure circuit 327 with conduit 514 moving piston 53 to the left for actuation of locking plate or ring 50 to secure and lock the dome in raised position, while plunger 344 is moved to its intermediate or neutral blocking position.

During the shifting and locking of the dome the plunger 145 has remained stationary in its raised position. Movement of the lever 311 to its right hand position or in a clockwise direction, as viewed in Figure 28, will couple conduit 405 to reservoir, thus releasing pressure against centralizing bushing 466 and piston 465 of the punch control valve 366 so that the existing pressure in conduit 414 may move the valve 366 to its extreme right hand position. In this position a reservoir connection is effected between conduit 468 and reservoir conduit 487 while pressure is coupled from 364 by way of groove 478 and conduit 159 to the stripping or retracting cylinders. At the same time pressure conduit 409 is coupled by way of groove 515 in valve 408 with conduit 489, shifting valve 490 to the left as viewed in Figure 27. This couples pressure conduit 327 with conduit 516 extending into the piston chamber 517 so that the coupled pressure will raise valve 471, providing a direct connection by way of the valve from 469 to reservoir connection 476. This valve, therefore, is, in effect, a dumping valve permitting of free discharge at an unrestricted rate of the liquid impounded beneath the pistons 139 and 141 and rendering the valve 488 ineffective for rate determination. It will be understood that since the periphery of the work in most instances is still supported by the portion of the nest circumscribing the die element 149 that the work will be stripped from the die during downward movement of the plunger and die, when the work may be readily removed and replaced with a new work piece.

What is claimed is:

1. A forming press including a base element and a dome element movable relative thereto, an actuator for effecting said relative movement, and means for controlling the actuator including a source of hydraulic pressure, conduit means connecting the source with the actuator and including a reversing valve, and controls for positioning the reversing valve including hydraulically actuable centralizers, individual pilot circuit conduits connected to the respective centralizers, a shiftable control valve having grooves permanently associated with said pilot conduits, pilot pressure conduits individual to the valve grooves and couplable thereby to the centralizer connected circuit conduits in one position of the said control valve, an additional pair of control conduits, one conduit of each pair being individual to one of the grooves of the control valve and the pairs being operatively connectable with the reversing valve pilot circuit conduits by shifting of the control valve, a source of pilot pressure fluid and a selector valve shiftable alternatively to couple said source with one or the other of said additional pair of conduits, a lock to prevent actuation of the selector valve, a releasable lock for the dome, operating means for the dome lock, and a pilot circuit including a valve actuated by releasing movement of the said dome lock operating means to a position permitting flow through the circuit, and lock release means coupled to the circuit and hydraulically actuable by flow in the circuit for disengaging the selector valve lock.

2. A forming press including a base element and a dome element movable relative thereto, an actuator for effecting said relative movement, and means for controlling the actuator including a source of hydraulic pressure, conduit means connecting the source with the actuator and including a reversing valve, and controls for positioning the reversing valve including hydraulically actuable centralizers, individual pilot circuit conduits connected to the respective centralizers, a shiftable control valve having grooves permanently associated with said pilot conduits, pilot pressure conduits individual to the valve grooves and couplable thereby to the centralizer connected circuit conduits in one position of the said control valve, an additional pair of control conduits, one conduit of each pair being individual to one of the grooves of the control valve and the pairs being operatively connectable with the reversing valve pilot circuit conduits by shifting of the control valve, a source of pilot pressure fluid and a selector valve shiftable alternatively to couple said source with one or the other of said additional pair of conduits, a lock to prevent actuation of the selector valve, a releasable lock for the dome, operating means for the dome lock, pilot circuit including a valve actuated by releasing movement of the said dome lock operating means to a position permitting flow through the circuit, and lock release means coupled to the circuit and hydraulically actuable by flow in the circuit for disengaging the selector valve lock, and means for shifting the selector valve when the lock is disengaged to a position which will condition the control circuits for shifting of the dome control valve to effect movement of the dome into forming position.

3. In a forming press having a base portion and a dome portion, means for moving the dome toward the base into forming position and for retracting the dome with respect to the base for disengagement of a formed workpiece, means for locking the dome in retracted position, additional means for locking the dome in forming position, hydraulic control and actuating circuits for the means for moving the dome and the means for locking the dome in retracted and forming position, and control means for determining the sequential shifting of said dome and said locking means including a hydraulically operable piston and cylinder for reversely shifting the means for locking the dome in retracted position, a reversing valve for determining the coupling of the control circuit to said cylinder, a progressively movable control unit having a cam coupled with said reversing valve to effect successive positionings of the valve, a circuit control valve for the dome moving means, the control unit having a cam phased with respect to the first specified cam to effect sequential positioning of said dome control valve in predetermined relation to the positioning of the dome lock valve, selector means for limiting the movement of the control unit, a trip release for the selector, means movable with the dome for effecting actuation of said trip release, a third control valve for the additional dome locking means, the control unit having a cam portion coupled with said third valve for operation thereof, the contour of said cam portion being so related to the other cams as to effect locking of the dome subsequent to the dome effected released of the selector upon progressive movement of the control unit.

4. A forming press including a base and a die holder movable toward the base to a closed forming position and away from the base to an open work piece disengaging position, a hydraulic actuator connected to the holder for effecting said toward and from movements, a releasable locking means to secure the die holder in an open position, a pilot pressure shiftable valve for controlling the activation of the hydraulic actuator, and means for controlling the operation of said valve including a pressure source and a primary pilot pressure conduit, a valve plunger movable for coupling said pilot pressure conduit for selected shifting of the actuator controlling valve, a restraining interlock for said valve plunger, and means actuated in synchronism with release of the die holder locking means for releasing said interlock to permit the movement of said valve plunger.

5. A forming press including a base and a die holder movable toward the base to a closed forming position and from the base to an open work piece disengaging position, a hydraulic actuator connected to the holder for effecting said toward and from movements, a releasable locking means to secure the die holder in an open position, a valve for controlling the actuation of the hydraulic actuator, a pilot circuit for controlling the position of said valve including a pilot pressure source and a pilot pressure conduit, a first selector valve means coupled with said conduit, an interlock between the releasable locking means and said valve means for controlling the movement of the valve means, a second selector valve, a first pair of pilot circuit conduits connecting said first and said second selector valves, and a second pair of conduits connecting the second selector valve with the actuator controlling valve, whereby shifting of the second selector valve determines the effective coupling of the pilot circuit by way of first selector valve means and said conduits with the actuator controlling valve.

6. A forming press including a base and a die holder movable toward the base to a closed forming position and from the base to an open work piece disengaging position, a hydraulic actuator connected to the holder for effecting said toward and from movements, a releasable locking means to secure the die holder in an open position, a valve for controlling the actuation of the hydraulic actuator, a pilot circuit for controlling the position of said valve including a pilot pressure source and a pilot pressure conduit, a first selector valve means coupled with said conduit, an interlock between the releasable locking means and said valve means for controlling the movement of the valve means, a second selector valve, a first pair of pilot circuit conduits connecting said first and said second selector valves, and a second pair of conduits connecting the second selector valve with the actuator controlling valve, and additional conduits directly connecting the pilot pressure conduit with said second selector valve, whereby shifting of the said second selector valve alternatively determines the effective connection of said pilot pressure conduit with the actuator control valve by way of or independent of said first selector valve means.

7. A forming press of the character described including a base and a die holder movable toward the base to a closed forming position and from the base to an open work piece disengaging position, a hydraulic actuator connected to the holder for effecting said toward and from movements, a releasable locking means to secure the die holder in an open position, a source of hydraulic pressure medium for operation of the actuator, a control valve shiftable to connect said source to the die holder actuator to effect movement of the die holder, a pilot circuit for controlling the activation of the hydraulic actuator including a pressure source and a pilot pressure conduit, a first pilot circuit valve movable for controlling the coupling of the pressure conduit with said control valve for actuation of the control valve, an interlock between the releasable locking means and said first pilot circuit valve for controlling the operation of said pilot circuit valve, pilot circuit connections between the first pilot circuit valve and the control valve including a second pilot circuit valve for controlling the reaction of the pilot pressure on the die holder control valve whereby said control valve is operable by pressure in the pilot pressure conduit when the conduit is coupled by said first and second pilot circuit valves to the control valve, an additional locking means for securing the die holder in closed position, a motor for operating said additional locking means, an interlock preventing operation of the motor when the die holder is in open position, and a control mechanism operated by movement of the die holder into closed forming position to release said interlock.

8. A forming press of the character described including a base, and a die holder movable toward the base to a closed forming position and away from the base to an open work piece disengaging position, a hydraulic actuator connected to the holder for effecting said toward and from movements, locking means for securing the die holder in closed position, power means for movement of said locking means, a cycle control unit movable for controlling the cycle of operation of said actuator and said power means, a stop for limiting the movement of said cycle control unit, a release for said stop actuable by movement of the die holder into closed position to permit continued movement of the cycle control unit for operation of said power means, an additional stop device for limiting said permitted movement of the cycle control unit, a trip actuable by movement of said die holder locking means, and actuating connections between said additional stop device and said trip for releasing said additional stop device when the trip is actuated by movement of the die holder locking means.

References Cited in the file of this patent

UNITED STATES PATENTS

| | | |
|---|---|---|
| 2,051,052 | Morgan | Aug. 18, 1936 |
| 2,143,429 | Auble | Jan. 10, 1939 |
| 2,192,778 | Stacy | Mar. 5, 1940 |
| 2,269,778 | Merrill | Jan. 13, 1942 |
| 2,289,584 | MacMillin et al. | July 14, 1942 |
| 2,294,676 | MacMillin et al. | Sept. 1, 1942 |
| 2,317,869 | Walton | Apr. 27, 1943 |
| 2,339,001 | Clay et al. | Jan. 11, 1944 |
| 2,375,599 | Walton | May 5, 1945 |
| 2,394,636 | Rode | Feb. 12, 1946 |
| 2,410,694 | Tyler | Nov. 5, 1946 |
| 2,455,837 | Waldie | Dec. 7, 1948 |
| 2,470,357 | MacMillin | May 17, 1949 |
| 2,491,402 | Tucker | Dec. 13, 1949 |
| 2,555,115 | Cizek | May 29, 1951 |
| 2,581,434 | Nowak | May 8, 1952 |
| 2,614,539 | Ernst | Oct. 21, 1952 |